United States Patent
Yamada

(10) Patent No.: US 8,055,362 B2
(45) Date of Patent: Nov. 8, 2011

(54) RECORDING-AND-REPRODUCING APPARATUS, INFORMATION TRANSFER-AND-MANAGEMENT METHOD, AND RECORDING MEDIUM

(75) Inventor: Eiichi Yamada, Tokyo (JP)

(73) Assignee: Sony Corporation (JP)

( * ) Notice: Subject to any disclaimer, the term of this patent is extended or adjusted under 35 U.S.C. 154(b) by 1609 days.

(21) Appl. No.: 11/070,744

(22) Filed: Mar. 2, 2005

(65) Prior Publication Data

US 2005/0207430 A1  Sep. 22, 2005

(30) Foreign Application Priority Data

Mar. 22, 2004  (JP) ................. P2004-082975

(51) Int. Cl.
*G06F 17/00* (2006.01)
*G06F 7/00* (2006.01)
*G06F 3/00* (2006.01)

(52) U.S. Cl. ............... 700/94; 707/805; 715/716

(58) Field of Classification Search .......... 700/94; 717/174; 713/1, 2; 710/10, 13; 715/716, 715/717, 723; 707/805, 913, 914, 915, 916, 707/999.107

See application file for complete search history.

(56) References Cited

U.S. PATENT DOCUMENTS

| 6,549,942 B1* | 4/2003 | Janky et al. ............ 709/219 |
| 6,760,721 B1* | 7/2004 | Chasen et al. .......... 707/3 |
| 7,227,073 B2* | 6/2007 | Kim ..................... 84/609 |
| 2002/0078367 A1* | 6/2002 | Lang et al. ............ 713/200 |
| 2003/0079038 A1* | 4/2003 | Robbin et al. ........ 709/232 |
| 2005/0015540 A1* | 1/2005 | Tsai et al. ............ 711/103 |

FOREIGN PATENT DOCUMENTS

| JP | 2000-284997 A | 10/2000 |
| JP | 2002-268925 A | 9/2002 |
| JP | 2002-359810 A | 12/2002 |
| JP | 2003-178017 A | 6/2003 |
| JP | 2004-086617 A | 3/2004 |
| JP | 2005-507130 A | 3/2005 |
| WO | WO 0133569 A1 * | 5/2001 |

OTHER PUBLICATIONS

Tetrault, Gregory, "Review: iTunes 2.0.2", archived on Aug. 6, 2002, ATPM, retrieved from www.archive.org, http://web.archive.org/web/20020806023041/http://atpm.com/7.12/itunes.shtml, pp. 1-11.* iLounge forums, "iPod File Folder System—F00 thru F19", Jun. 18-19, 2003, http://forums.ilounge.com, http://forums.ilounge.com/third-party-software-mac-pc/2889-ipod-file-folder-system-f00-thru-fl9-print.html, pp. 1-3.*

(Continued)

*Primary Examiner* — Davetta Goins
*Assistant Examiner* — Daniel Sellers
(74) *Attorney, Agent, or Firm* — Lerner, David, Littenberg, Krumholz & Mentlik, LLP

(57) ABSTRACT

A software program of a flash memory loaded into an IC recorder is read and executed by a PC connected to the IC recorder via an external interface and an input-and-output end, so that an information signal, such as audio data held by the PC, is transferred from the PC to the flash memory. Management information about the information signal that is transferred and stored in the flash memory is, generated by the software program executed by the PC and stored in the flash memory, so that the IC recorder can use the management information.

9 Claims, 17 Drawing Sheets

OTHER PUBLICATIONS

Nobuyuki Hayshia, How was i-application born and evolved? Mac evolves to the partner to the life by iLife, MACPOWER, Japan, ASCII Co., Ltd., Apr. 1, 2003, vol. 14, No. 4, p. 78-79.

Fumihiko Shibata, Music-style changed by MusiciPodm MacPeople, Japan, ASCII Co., Ltd., Nov. 1, 2002 vol. 8 No. 21, p. 60-61.

iPod & iTunes 4, MacPeople, ASCII Co., Ltd., Jun. 15, 2003, vol. 9 No. 12, p. 43.

Takeshi Fujimoto, iTunes of Windows version corresponding to the AAC with high audio quality, ASAHI personal computer, Japan, Asahi Shimbun, Jan. 15, 2004, No. 351, p. 140.

Kazu Shiroi, Debut of apple-original MP3 software, Mac jukebox by iTunes, MacPeopleBeginners, Japan, ASCII Co., Ltd., Apr. 1, 2001, vol. 5, p. 56-59.

Kenichi Shimoda, The Missing Sync 3.0, MACPOWER, Japan, ASCII Co., Ltd., Aug. 1, 2002, vol. 13, No. 8, p. 131.

Japanese Office Action issued on Jun. 6, 2008 in connection with corresponding Japanese Application No. 2004-082975 (14 pages).

* cited by examiner

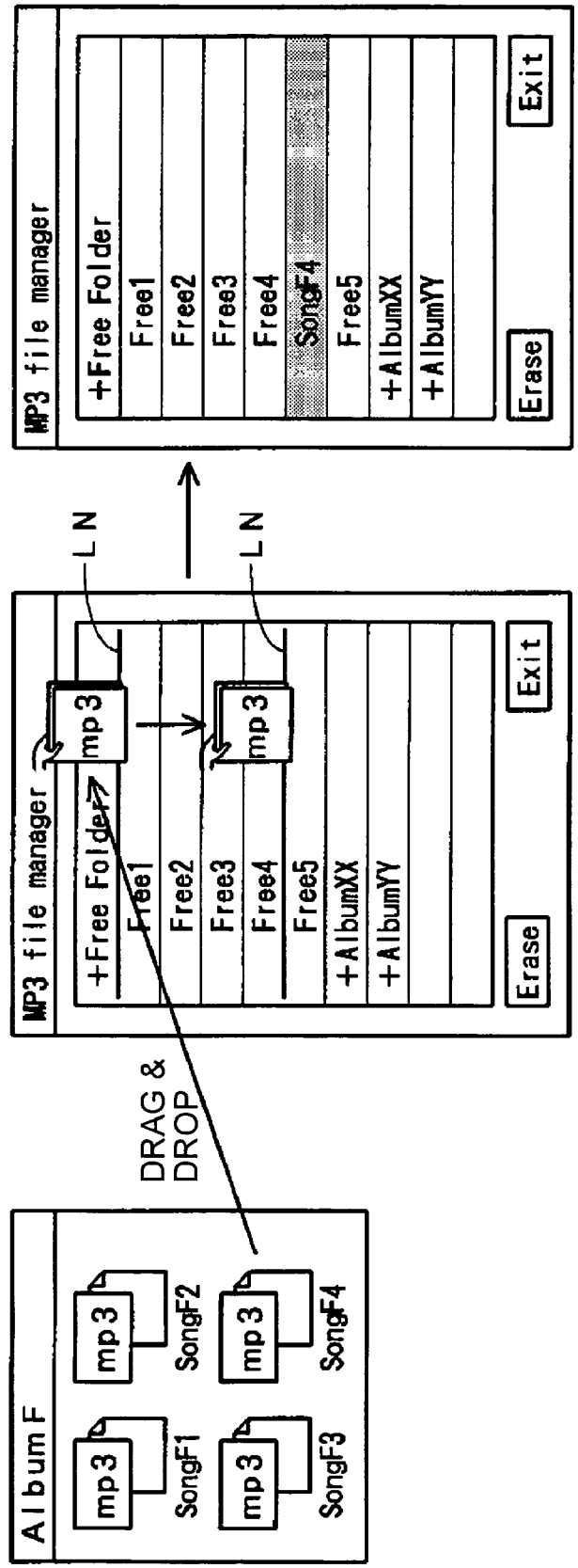

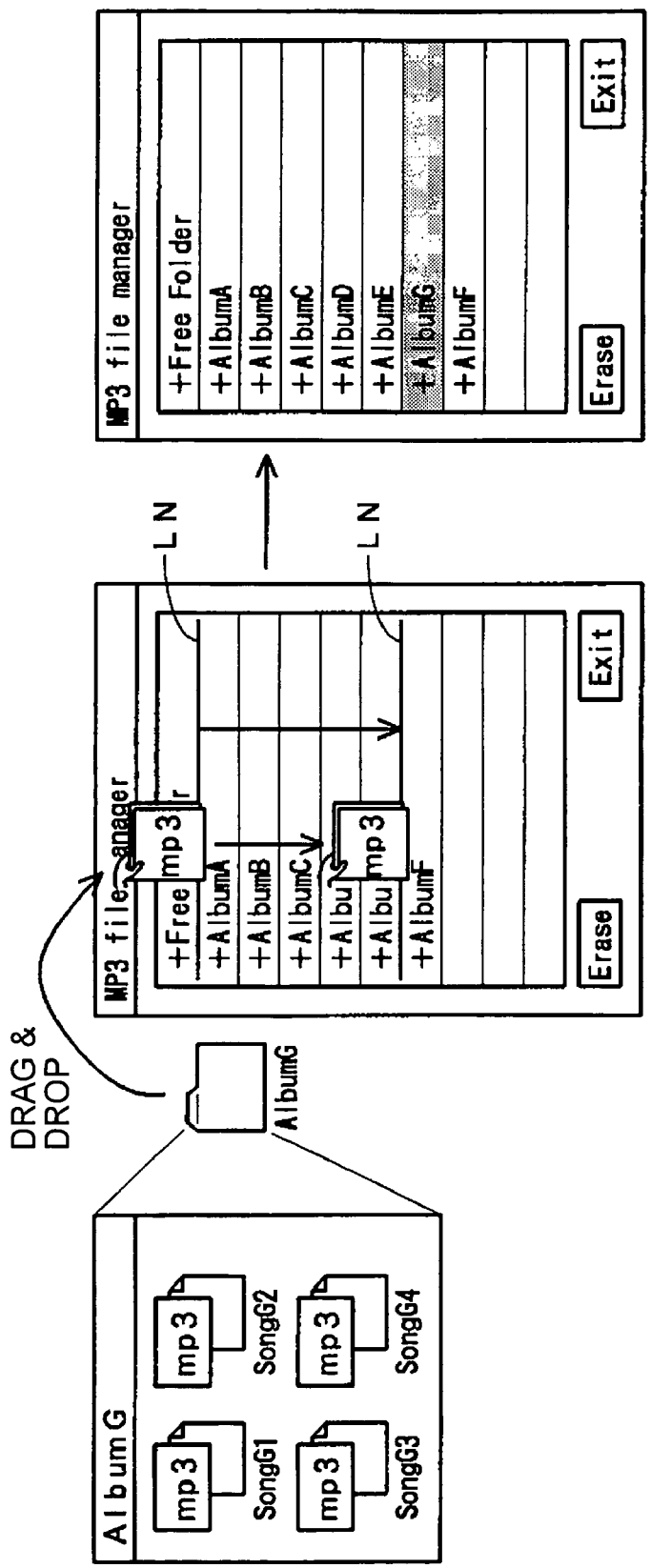

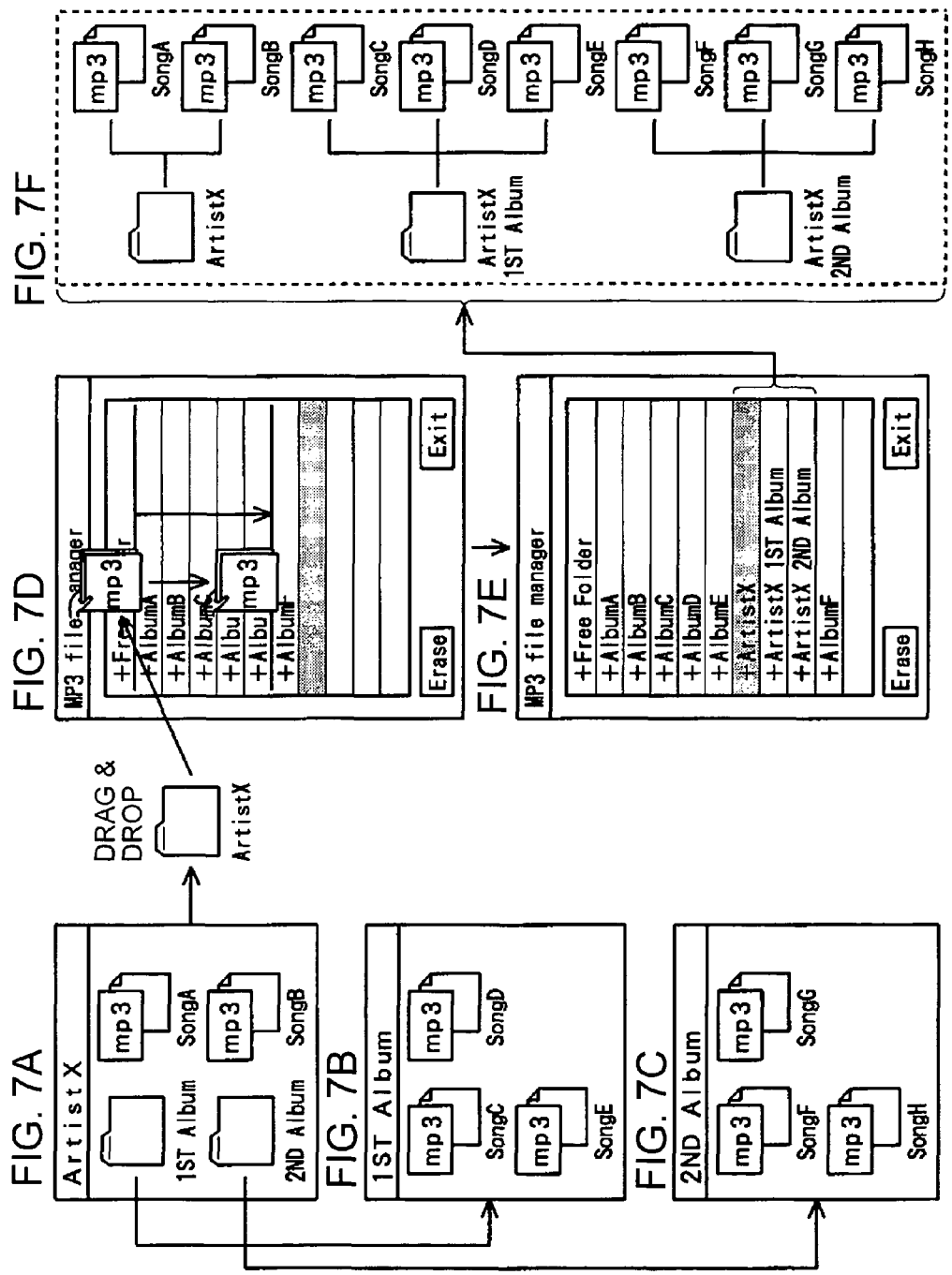

REPRODUCTION-ORDER MANAGEMENT LIST

DRAG & DROP

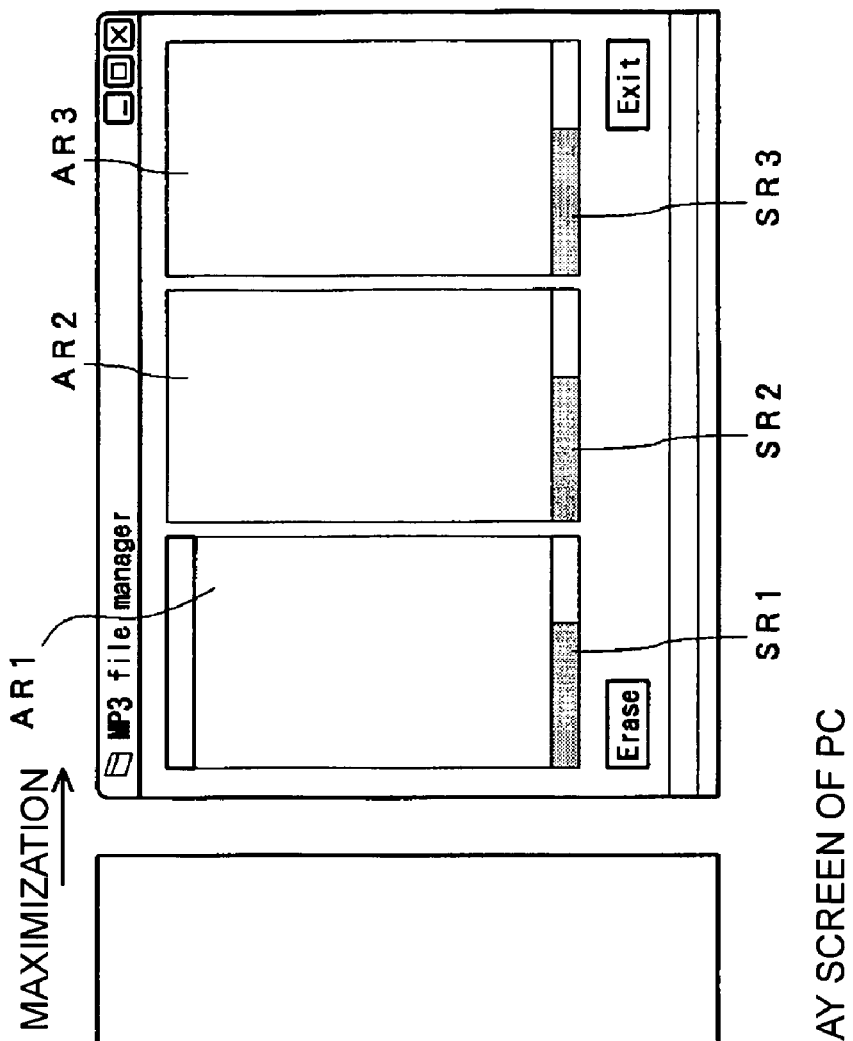
FIG. 17A LIST (MINIMIZED)
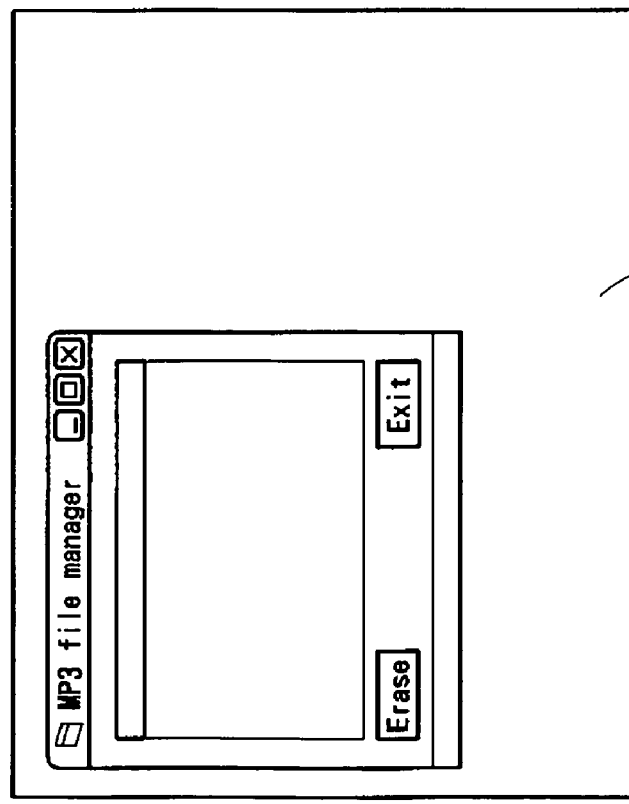
FIG. 17B LIST (MAXIMIZED)

RECORDING-AND-REPRODUCING APPARATUS, INFORMATION TRANSFER-AND-MANAGEMENT METHOD, AND RECORDING MEDIUM

BACKGROUND OF THE INVENTION

1. Field of the Invention

The present invention relates to a recording-and-reproducing apparatus such as an integrated-circuit (IC) recorder using a semiconductor memory, as a non-transitory recording medium, an information transfer-and-management method for transferring an information signal to the recording-and-reproducing apparatus and managing the transferred information signal, and a recording medium of the recording-and-reproducing apparatus.

2. Description of the Related Art

Recently, recording-and-reproducing apparatuses such as IC recorders using a semiconductor memory, as a recording medium have been widely used. Audio data (music data) is often stored in the semiconductor memory loaded into the IC recorder so that the IC recorder can be used, as an audio player.

Usually, audio data accumulated on a personal computer (PC) is transferred and stored in the semiconductor memory loaded into the IC recorder via the PC. In that case, a software program for transferring the audio data to the IC recorder or managing the transferred audio data should be installed on the PC in advance.

Then, the software program is started in the PC, audio data for transfer is selected from among the audio data accumulated on the PC, and a transfer instruction is inputted. Subsequently, predetermined audio data is transferred and stored in the semiconductor memory loaded into the IC recorder so that the IC recorder can reproduce the predetermined audio data for use.

Japanese Unexamined Patent Application Publication No. 2002-328860 discloses a technology for receiving predetermined audio data from a PC by transmitting a transfer instruction from a predetermined terminal that is the transfer destination of the audio data to the PC. This technology is intended for users who want to transfer audio data from the PC to an audio player, even though they are not accustomed to operating PCs. The above-described technology allows users to receive audio data without directly operating the PC.

However, according to the above-described technology, a software program for transmitting and receiving audio data needs to be installed on both the PC functioning as the audio-data sender and the terminal functioning as the audio-data destination. When the software program is executed and predetermined communication procedures are performed, the audio-data transfer is achieved. Thus, the above-described technology does not allow receiving transferred audio data with ease from any type of PCs.

As described above, according to the above-described technology, the software program for transferring the audio data accumulated on the PC to the IC recorder and managing the transferred audio data needs to be installed on the PC. Subsequently, the user is not allowed to receive audio data transferred from a PC that does not include the software program.

Therefore, IC recorders that support for transferring audio data accumulated on a PC to a predetermined folder (directory) generated in a semiconductor memory loaded into the IC recorder through a drag-and-drop operation by using the function of the PC have been provided.

According to the above-described system, however, the audio data transferred to the predetermined folder can only be reproduced according to a predetermined order including the order in which the audio data was dragged and dropped, the name (title) order, and so forth. That is to say, the audio data cannot be reproduced in an order that the user intends.

In recent years, there have been demands for transferring abundant audio data provided for private use to a memory loaded into an IC recorder and using the audio data easily anytime and anywhere through buying predetermined audio data (music contents) and/or receiving audio contents that is provided free of charge for a predetermined time period and/or sample audio data provided free of charge, and so on at anytime and from anywhere via a network such as the Internet.

SUMMARY OF THE INVENTION

Accordingly, it is desirable to provide a recording-and-reproducing apparatus, an information transfer-and-management method, and a recording medium that are configured to easily receive various types of information signals such as audio data for private use and reproduce the information signals in a predetermined format specified by a user without using an information-processing apparatus such as a PC, where the information-processing apparatus transmits the information signals.

According to an embodiment of the present invention, there is provided a recording-and-reproducing apparatus comprising a connection end for connecting to an information-processing apparatus, a memory that is accessible by the information-processing apparatus connected to the connection end and that stores a software program executed by the information-processing apparatus so that at least one information signal is transferred from the information-processing apparatus and managed, a data memory that stores the at least one information signal transferred from the information-processing apparatus, where the software program is executed by the information-processing apparatus, a management memory for storing management information of the at least one information signal stored in the data memory, the management information being generated by the software program executed by the information-processing apparatus, and a reproduction-control unit that performs control processing, so as to reproduce the at least one information signal stored in the data memory based on the management information stored in the management memory.

According to the above-described recording-and-reproducing apparatus, the information-processing apparatus connected to the connection end reads and executes the software program stored in the memory of the recording-and-reproducing apparatus, the at least one information signal held by the information-processing apparatus is transferred from the information-processing apparatus to the recording-and-reproducing apparatus and stored in the data memory of the recording-and-reproducing apparatus. In that case, due to the software program executed by the information-processing apparatus, the management information about the information signal in the data memory is generated, and stored in the management memory so that the recording-and-reproducing apparatus can use the management information.

Subsequently, it becomes possible to transfer the at least one information signal with ease by using the software program stored in the memory of the recording-and-reproducing apparatus without installing the software program for transferring the information signal to the information-processing apparatus and managing the transferred information signal.

Further, the at least one information signal can be reproduced in the order that the user intends, based on the management information stored in the management memory.

Preferably, in the above-described recording-and-reproducing apparatus, the software program is configured to transfer the at least one information signal in files and/or folders, wherein each of the folders includes a plurality of the files.

Therefore, by using the software program executed by the information-processing apparatus, the at least one information signal can be transferred in files (in tracks in the case of audio data) and/or folders (in albums in the case of audio data).

Subsequently, it becomes possible to transfer and accumulate information signals specified by the user on the recording-and-reproducing apparatus for use in a predetermined format specified by the user.

Preferably, in the above-described recording-and-reproducing apparatus, the software program is configured to move a reproduction position of the at least one information signal stored in the data memory, delete the at least one information signal stored in the data memory, and change the management information stored in the management memory according to the moving and the deletion.

Therefore, by using the software program executed by the information-processing apparatus, the information signal stored in the data memory can be moved and/or deleted. Further, the management information can be updated according to the moving and/or deletion of the information signal.

Accordingly, it becomes possible to change the reproduction order and/or delete an unnecessary information signal after the information signal is transferred to the recording-and-reproducing apparatus, so as to reproduce a predetermined information signal in a desired order for use.

The present invention eliminates the need for installing a software program for transferring at least one information signal from an information-processing apparatus to a recording-and-reproducing apparatus onto the information-processing apparatus in advance. In the information-processing apparatus that can be connected to the recording-and-reproducing apparatus, a software program stored in a memory of the recording-and-reproducing apparatus is executed, so as to transfer the information signal to the recording-and-reproducing apparatus and manage the transferred information signal.

Further, the at least one information signal can be transferred from the information-processing apparatus to the recording-and-reproducing apparatus in files and/or folders. Therefore, it becomes possible to transfer and manage the information signal in a format predetermined by a user.

Further, it becomes possible to move and/or delete the information signal transferred to the recording-and-reproducing apparatus, so as to change the reproduction order and dispose of an unnecessary information signal. Therefore, the data memory of the recording-and-reproducing apparatus can be used with efficiency.

BRIEF DESCRIPTION OF THE DRAWINGS

FIG. 5A illustrates audio data transferred in files;

FIG. 5B also illustrates the audio data transferred in files;

FIG. 5C also illustrates the audio data transferred in files;

FIG. 6A illustrates audio data transferred in folders;

FIG. 6B also illustrates the audio data transferred in folders;

FIG. 6C also illustrates the audio data transferred in folders;

FIG. 7A illustrates an example where a folder having a hierarchical structure is transferred;

FIG. 7B also illustrates the example where the folder having the hierarchical structure is transferred;

FIG. 7C also illustrates the example where the folder having the hierarchical structure is transferred;

FIG. 7D also illustrates the example where the folder having the hierarchical structure is transferred;

FIG. 7E also illustrates the example where the folder having the hierarchical structure is transferred;

FIG. 7F also illustrates the example where the folder having the hierarchical structure is transferred;

FIG. 17A shows a modification example of the display image of a stored-audio-data list; and FIG. 17B also shows the modification example of the display image of the stored-audio-data list.

DESCRIPTION OF THE PREFERRED EMBODIMENTS

Hereinafter, an apparatus, a method, and a recording medium according to an embodiment of the present invention will be described with reference to the attached drawings. In this embodiment, an IC recorder includes the apparatus, a system including the IC recorder and a personal computer (PC) uses the method, and a memory card that can be attached/detached to/from the IC recorder includes the recording medium.

[The Configuration of System]

Figure 1:
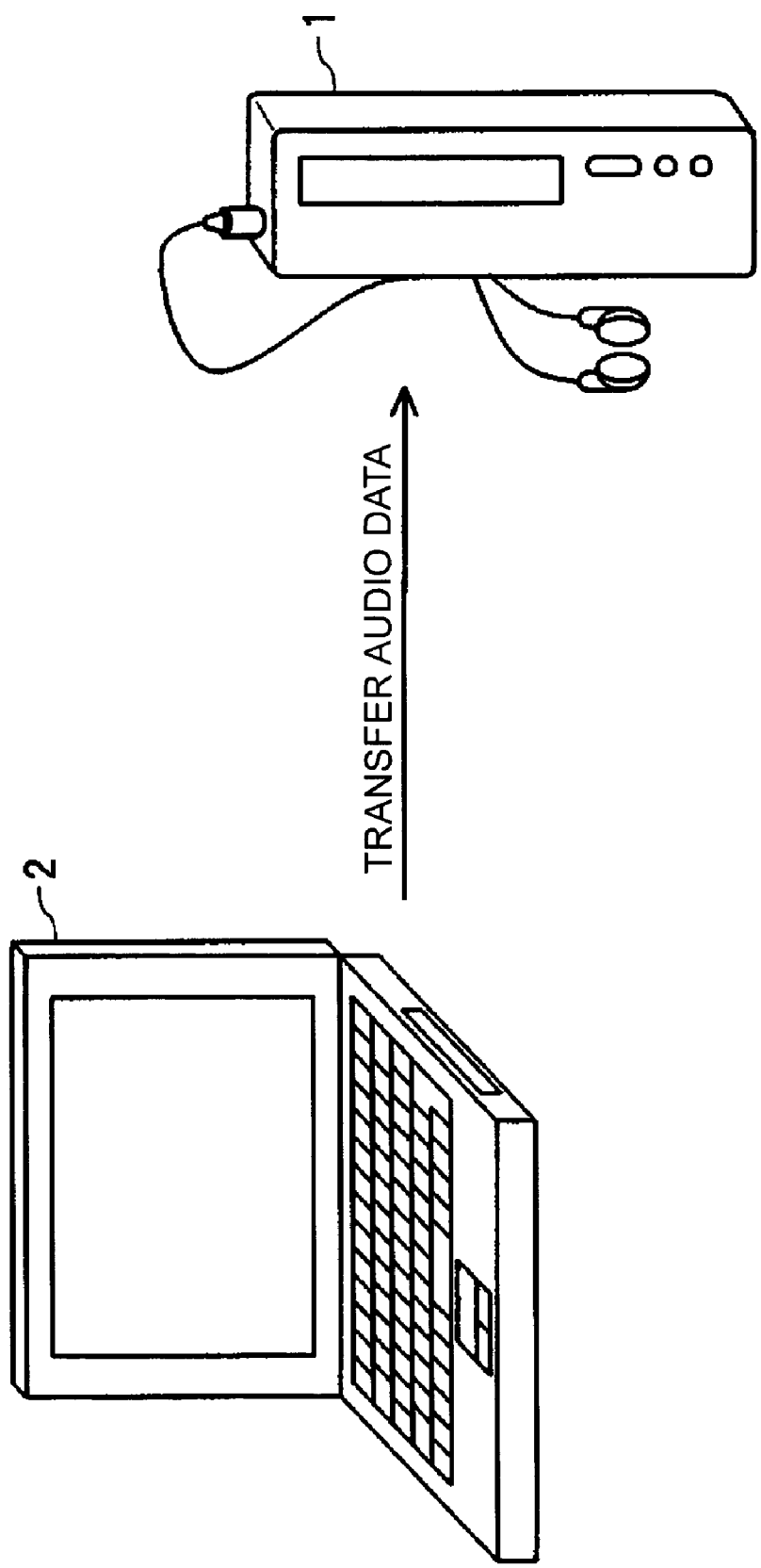
FIG. 1 illustrates a system according to an embodiment of the present invention, the system including an IC recorder according to this embodiment.

FIG. 1 schematically illustrates the system according to this embodiment. As shown in this drawing, this system includes an IC recorder 1 and a PC 2 that are connected to each other by a digital interface including a universal serial bus (USB), an institute of electrical and electronics engineers (IEEE) 1394, and so forth.

Further, predetermined audio data is selected from among various types of audio data (music data) accumulated on a hard disk of the PC 2 and transferred to the IC recorder 1 through a simple operation, that is, a drag-and-drop operation, so that the predetermined audio data is stored in a memory of the IC recorder 1.

According to this embodiment, the audio data is not simply transferred from the PC 2 to the IC recorder 1. Since the recording capacity of the memory storing the audio data is relatively large, the memory can store audio data corresponding to a large number of tracks. Therefore, this embodiment allows for managing the audio data transferred to the memory so that a user of the IC recorder 1 can reproduce the audio data in the order that the user intends.

Further, the drag-and-drop operation performed in the PC 2 allows for selecting a display object such as an icon and an option, moving the display object being held selected to a predetermined position, and canceling a selection instruction that was issued for the display object by releasing the display object. Thus, the display object is moved to the predetermined position.

[Basic Configuration of IC Recorder 1]

Figure 2:
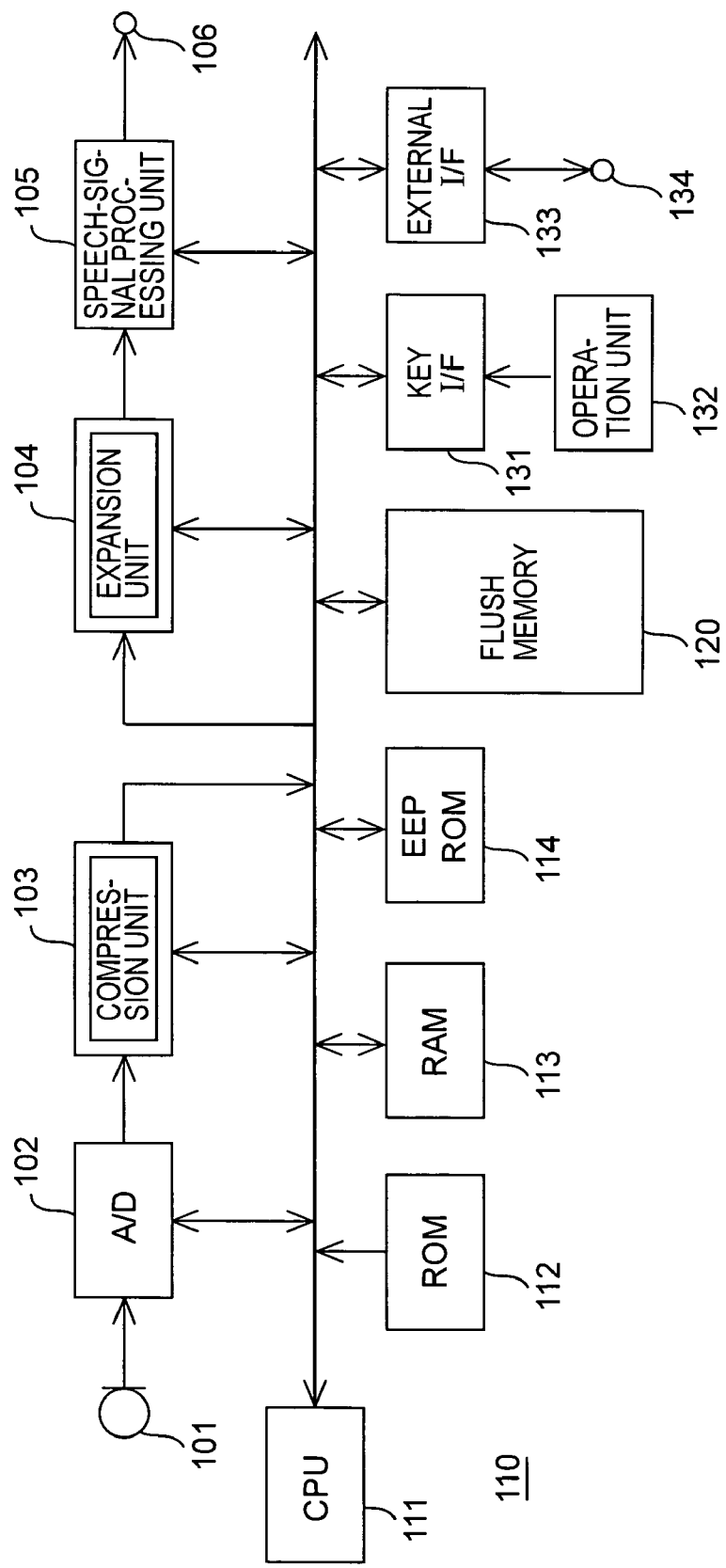
FIG. 2 is a block diagram illustrating the IC recorder.

Next, the basic configuration of the IC recorder 1 of this embodiment will be described. FIG. 2 is a block diagram illustrating the IC recorder 1.

As shown in this drawing, the IC recorder 1 includes a microphone 101, an analog/digital conversion unit (hereinafter referred to as an A/D conversion unit) 102, a compression unit 103, an expansion unit 104, a speech-signal processing unit 105, a speech-signal output end 106, a control unit 110, a flush memory 120, a key interface (hereinafter referred to as a key I/F) 131, an operation unit 132, an external I/F 133, and an input-and-output terminal 134.

The control unit 110 is a microcomputer configured to control each of the units of the IC recorder 1. As shown in this drawing, the control unit 110 includes a central processing unit (CPU) 111, a read-only memory (ROM) 112, a random-access memory (RAM) 113, and an electrically-erasable and programmable ROM (EEPROM) 114 that are connected to one another via a CPU bus 115.

The ROM 112 stores various programs executed by the CPU 111 and data necessary for processing, and the RAM 113 is mainly used, as a working area during various types of processing is performed. Further, the EEPROM 114 is a nonvolatile memory configured to store and hold data that should be held after the power of the IC recorder 1 is shut down, such as various types of setting parameters.

The flush memory 120 is a memory having a relatively large storage capacity and used mainly for holding the audio data. The flush memory 120 is configured to be used, as an external memory of the PC 2 that is connected thereto via the input-and-output end 134. Further, a software program executed by the PC 2 is stored in the flush memory 120 in advance. The flush memory 120 will be described in detail later on.

That is to say, the flush memory 120 is a memory that is accessible by the PC 2 and that stores audio data transferred from the PC 2, audio data collected by the microphone 101, and a management file for storing the management information of the audio data. This configuration will be described later.

When a recording key of the operation unit 132 is operated, the control unit 110 exerts control over an input system including the A/D conversion unit 102, the compression unit 103, and so forth. Further, speech collected by the microphone 101 is converted into an electrical signal and transmitted to the A/D conversion unit 102, as an analog-audio signal (analog-speech signal).

The A/D conversion unit 102 converts the analog-audio signal transmitted thereto into a digital-speech signal and transmits the digital signal to the compression unit 103. The compression unit 103 compresses digital-audio data, that is, the digital-speech signal transmitted thereto in a predetermined manner, and externally transmits the compressed digital-audio data. The compressed digital-audio data transmitted from the compression unit 103 is stored in the flush memory 120 via the control unit 110.

In this embodiment, the external I/F 133 and the input-and-output end 134 are configured to comply with a digital interface including the USB, the IEEE 1394, and so forth. Further, audio data transferred from the PC 2 connected to the input-and-output end 134 can be stored in the flush memory 120. This operation will be described in detail later on.

As described above, the flush memory 120 of the IC recorder 1 can be used, as the external memory of the PC 2 connected to the IC recorder 1 via the input-and-output end 134.

Therefore, when the PC 2 of the system of this embodiment executes the software program that is configured to transfer and manage audio data and that is stored in the flush memory 120, audio data accumulated on the hard disk of the PC 2 is transferred and copied to the flush memory 120 through the simple drag-and-drop operation. Further, management information for controlling the reproduction order of the audio data is generated. The management information can be managed by a management file generated in the flush memory 120.

When a reproduction key of the operation unit 132 is operated, the control unit 110 exerts control over an output system including the expansion unit 104, the speech-signal processing unit 105, and so forth, so that the audio data stored in the flush memory 120 is read and transmitted to the expansion unit 104. The expansion unit 104 expands the audio data transmitted thereto, so as to reconstruct the audio data before being compressed, and transmits the reconstructed audio data to the speech-signal processing unit 105.

The speech-signal processing unit 105 converts the reconstructed audio data, that is, the expanded audio data transmitted from the expansion unit 104 into an analog signal. Otherwise, the speech-signal processing unit 105 adjusts the quality and/or volume of the speech signal and externally transmits the speech signal after being subjected to the above-described processing via the speech-signal output end 106 under the control of the control unit 110. A pair of headphones or an earphone is connected to the speech-signal output end 106 so that a user can listen to a reproduced speech sound therethrough.

Although not shown in this drawing, the IC recorder 1 of this embodiment includes a liquid-crystal display (LCD) for producing the images of various types of information including the operation state, an error message, and so forth for the user.

Thus, the IC recorder 1 of this embodiment is configured to store and hold the audio data corresponding to a speech sound collected by the microphone 101 and the audio data transmitted from the PC 2 connected to the input-and-output end 134. Further, the IC recorder 1 is configured to reproduce and externally transmit the above-described audio data according to an instruction transmitted from the user.

[Basic Configuration of PC 2]

Figure 3:
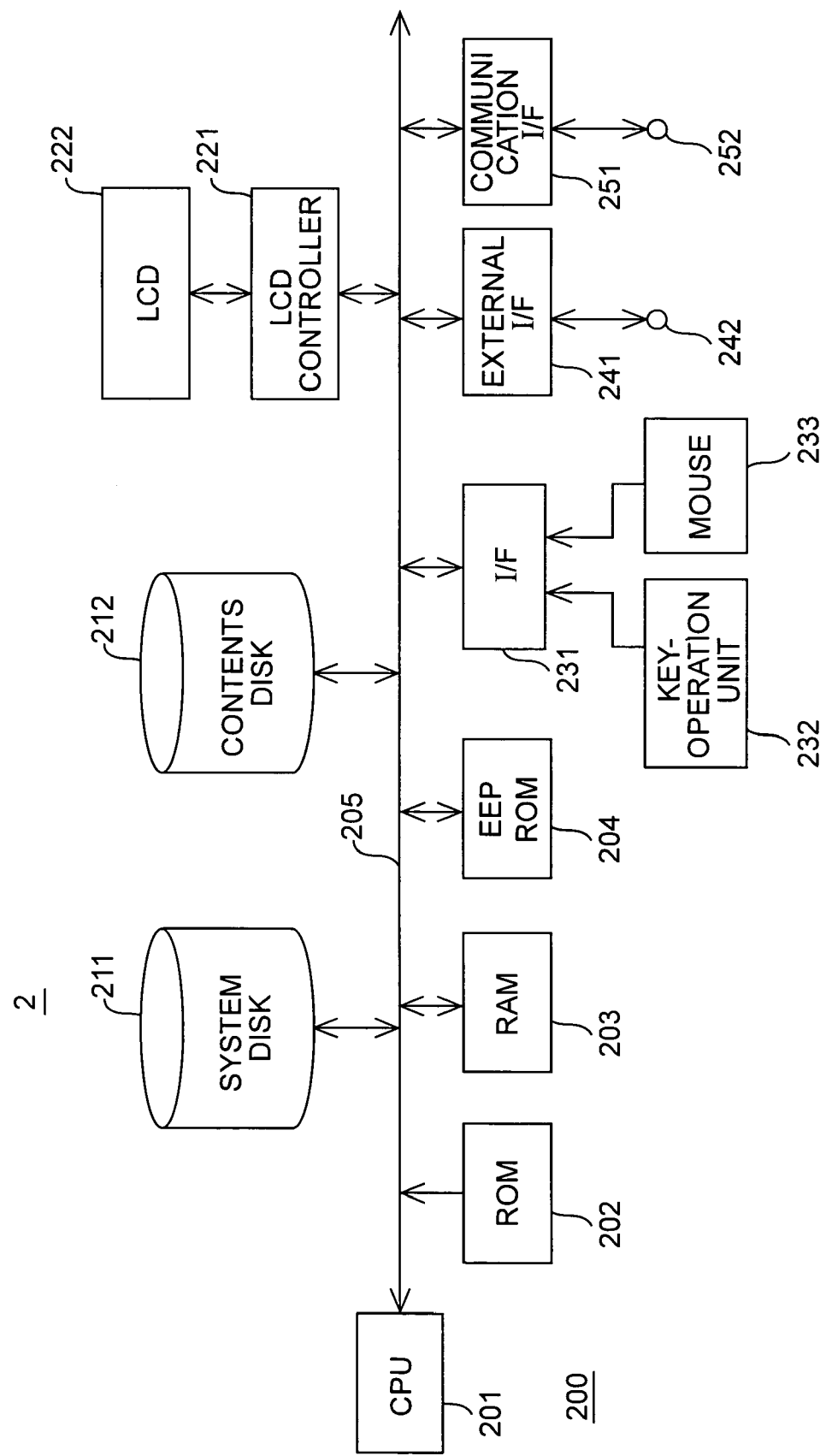
FIG. 3 is a block diagram illustrating a personal computer (PC) of the system.

Next, the basic configuration of the PC 2 of this embodiment will be described. FIG. 3 is a block diagram illustrating the PC 2 used in the system of this embodiment. The PC 2 is configured, as an ordinary notebook PC, and includes a control unit 200, a system disk 211, a contents disk 212, an LCD controller 221, an LCD 222, an I/F 231, a key-operation unit 232, a mouse (pointing device) 233, an external I/F 241, an input-and-output end 242, a communication I/F 251, and a connection end 252, as shown in this drawing.

The control unit 200 is a microcomputer configured to exert control over each of the units of the PC 2. The control unit 200 includes a CPU 201, a ROM 202, a RAM 203, an EEPROM 204 that are connected to one another via a CPU bus 205. The ROM 202 stores programs executed by the CPU 201 and data necessary for performing processing. The RAM 203 is mainly used, as a working area. The EEPROM 204 is a nonvolatile memory configured to store data that should be held after the power of the PC 2 is shut down.

Further, each of the system disk 211 and the contents disk 212 is a hard disk having a large capacity. The system disk 211 is configured to store and hold various types of application programs, font data, the format set, and so forth, for example. Further, the contents disk 212 is configured to accumulate various types of contents data including audio data, video data, and so forth.

The LCD 222 has a relatively large-sized display screen and can produce various types of display images under the control of the LCD controller 221 under the control of the control unit 200.

The key-operation unit 232 is a keyboard having alphabet keys, ten-keys, and various types of function keys, and the mouse 233 is used, as a pointing device. Operation instructions transmitted from the user through the key-operation unit 232 and the mouse 233 are transmitted to the control unit 200 via the I/F 231. Subsequently, the control unit 200 can exert control over each of the units of the PC 2 according to the operation instruction transmitted from the user.

Further, in this embodiment, the external I/F 241 and the input-and-output end 242 comply with a digital interface such as the USB and the IEEE 1394, as is the case with the above-described external I/F 133 and input-and-output end 134 of the IC recorder 1. Therefore, the PC 2 can be connected to the above-described IC recorder 1, for example.

The communication I/F 251 and the connection end 252 can be connected to a wide-area network such as the Internet via the telephone network, a cable-TV network, and so forth, for example, so as to allow the user to transmit and/or receive an electronic mail, read a Web page, and so forth.

Further, the PC 2 of this embodiment can be connected to the Internet via the communication I/F 251 and the connection end 252, for example. Subsequently, various types of contents data including audio data, video data, and so forth that are downloaded from a predetermined contents server on the Internet can be accumulated on the contents disk 212.

The PC 2 of this embodiment can reproduce the various contents data accumulated on the contents disk 212, and transfer and copy the audio data accumulated on the contents disk 212 to the memory of the IC recorder 1 connected to the PC 2 via the external I/F 241 and the input-and-output end 242.

According to the above-described configuration, as described above, the PC 2 can have access to the flush memory 120 of the IC recorder 1 connected thereto via the external I/F 241 and the input-and-output end 242. That is to say, the PC 2 can use the IC recorder 1 connected thereto, as its own external drive.

Further, the flush memory 120 stores the software program for transferring audio data from the PC 2 to the IC recorder 1 and managing the transferred audio data. The PC 2 executes the software program stored in the flush memory 120, transfers the audio data to the IC recorder 1, and manages the transferred audio data.

That is to say, the software program for transferring audio data to the IC recorder 1 and managing the audio data may not be installed in the PC 2 of this embodiment. It becomes possible to transfer and copy audio data accumulated on a PC to the IC recorder 1 of this embodiment and manage the audio data, even though the configuration of the PC is different from that of the PC 2, as long as the PC can be connected to the IC recorder 1 of this embodiment.

[Operations Performed for Transferring and Managing Audio Data]

Next, detailed explanations of the case where the audio data accumulated on the PC 2 is transferred and copied to the IC recorder 1, and managed therein in the system of this embodiment including the IC recorder 1 and the PC 2 will be provided. The audio data described in the following explanations is compressed according to the MPEG-1 audio layer 3 (MP3) method.

Figure 4:
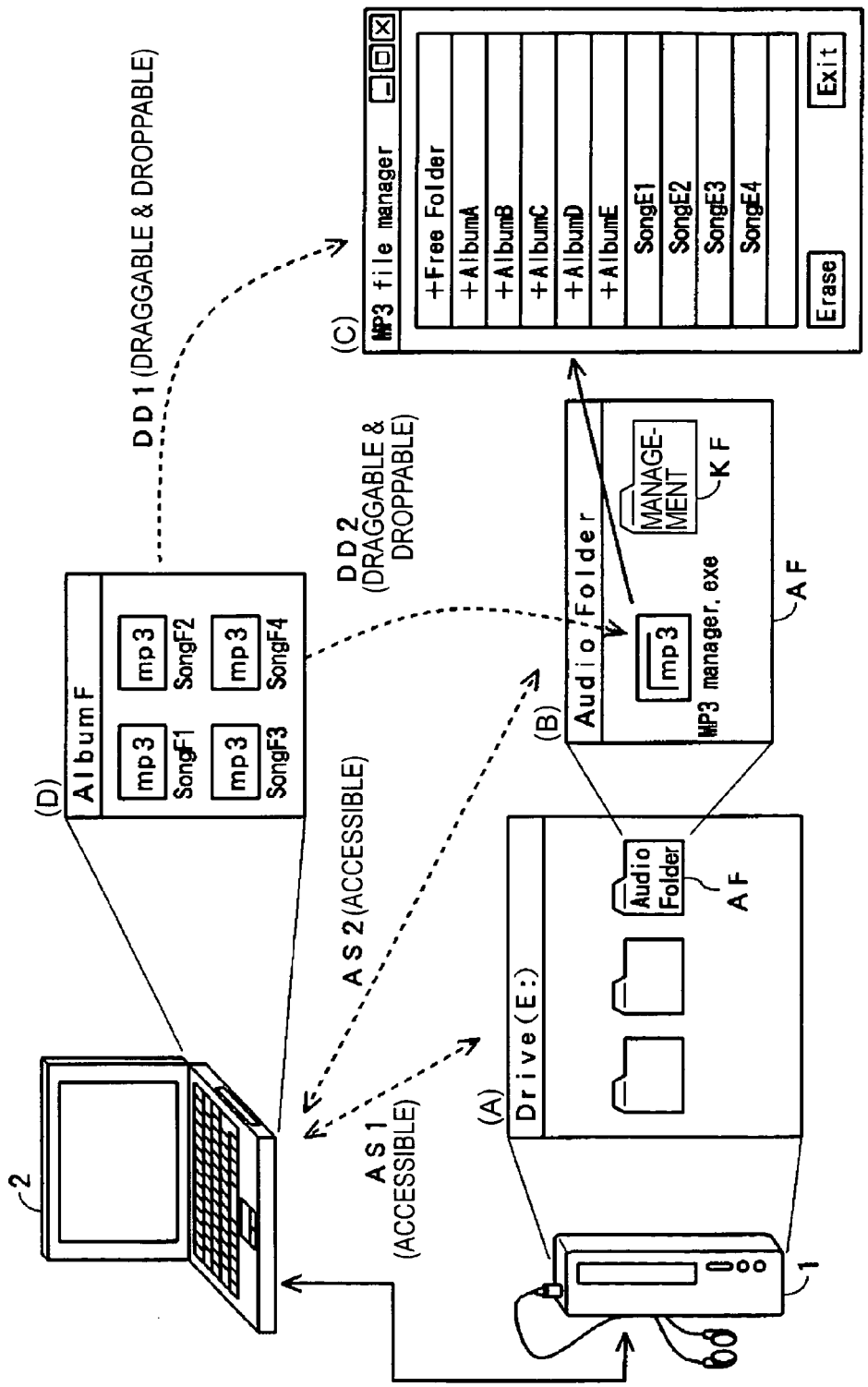
FIG. 4 illustrates operations performed for transferring audio data from the PC to the IC recorder and managing the transferred audio data.

FIG. 4 illustrates operations performed for transferring the audio data from the PC 2 to the IC recorder 1 and managing the audio data therein, in the system of this embodiment. As shown in this drawing, the IC recorder 1 and the PC 2 are connected to each other via a predetermined digital interface including the USB, the IEEE 1394, and so forth. Where the IC recorder 1 is connected to the PC 2, the IC recorder 1 can be used, as the external drive of the PC 2, as described above.

In this embodiment, the IC recorder 1 functions, as an external drive E (Drive E:) shown in section (A) for the PC 2. More specifically, the external drive E denotes the flush memory 120 of the IC recorder 1. The flush memory 120 is provided with an audio folder AF in advance. The audio folder AF is configured to store transferred audio data and manage the transferred audio data.

The audio folder AF has a software program "MP3 manager.exe" that is executed by the PC 2 and that was installed therein at the time of manufacturing, as shown in section (B). The above-described program is configured to transfer audio data from the PC 2 connected to the IC recorder 1 via the digital interface to the IC recorder 1 and manage the transferred audio data.

Then, as shown in this drawing, the PC 2 makes access to the audio folder AF, as indicated by broken arrows AS1 and AS2, and selects the software program "MP3 manager.exe". Subsequently, the PC 2 can execute a program "MP3 file manager" configured to transfer and manage audio data.

When the PC 2 executes the MP3 file manager, the LCD 222 produces an image of the list of audio data that had been stored in the audio folder AF of the IC recorder 1 is produced on the LCD 222, as shown in section (C) of this drawing, based on a reproduction-order management list stored in a management folder KF of the audio folder AF shown in section (B) of this drawing. Hereinafter, the above-described list is referred to as a stored-audio-data list.

In the stored-audio-data list shown in section (C), each of rows indicated by plus signs shown at their heads denotes an album, that is, a folder including audio data corresponding to a plurality of tracks. Further, each of rows having no plus signs denotes an audio-data file corresponding to a single track.

The audio-data file shown in section (C) shows a folder referred to as "Free Folder" in which the user can store various types of audio-data files according to his/her own free will. The audio-data file shown in section (C) further shows albums or folders storing two or more audio-data files, that is, "AlbumA", "AlbumB", "AlbumC", "AlbumD", "AlbumE", and so forth in that order. Each of the albums or folders includes audio-data files corresponding to tracks. For example, the folder "AlbumE" includes audio-data files that correspond to "SongE1", "SongE2", "SongE3", and so forth, respectively.

Further, where the entire folder "AlbumF" that is stored in the contents disk 202 and that is shown in section (D), or a single audio-data file such as the audio-data file "SongF1", the audio-data file "SongF2", and so forth that are stored in the folder "AlbumF" is dragged and dropped into the stored-audio-data list shown in section (C), as indicated by broken arrow DD1 shown in this drawing, the entire folder "AlbumF", or the single audio-data file can be transferred to the flush memory 120 of the IC recorder 1 and stored therein.

In that case, the storing position (display position) of the folder "AlbumF", or the audio-data file can be specified on the stored-audio-data list. The storing position of the folder "AlbumF", or the audio-data file corresponds to the reproduction order thereof. Of course, this embodiment allows for reproducing only a predetermined track of a predetermined album and reproducing the tracks of the predetermined album beginning from the predetermined track. However, in the case where two or more tracks are reproduced in sequence, this embodiment allows for reproducing the tracks in the order shown in the stored-audio-data list shown in section (C).

Further, this embodiment allows for moving and/or deleting a predetermined stored album and/or a predetermined stored audio-data file on the stored-audio-data list shown in section (C), as will be described later. Therefore, the user of the IC recorder 1 changes the display position of a predetermined audio data shown in the stored-audio-data list through the PC 2, so as to change the reproduction order of the predetermined audio data.

Further, as indicated by broken arrow DD2 shown in this drawing, the entire folder "AlbumF" stored in the contents disk 202, or a single audio-data file such as the "SongF1", the "SongF2", and so forth that are stored in the folder "AlbumF" is dragged and dropped into icon "MP3 file manager" shown in section (B). Subsequently, the entire folder "AlbumF", or the single audio-data file can be transferred to the flush memory 120 of the IC recorder 1 and stored therein.

In that case, unlike the case where the folder and/or the audio-data file is transferred to the stored-audio-data list shown in section (C), the folder and/or the audio-data file transferred to the icon "MP3 file manager" shown in section (B) is stored in a predetermined position in the stored-audio-data list. For example, where a predetermined folder is transferred to the icon "MP3 file manager" shown in section (B), the predetermined folder is stored in the position next to the "Free Folder". Further, where a predetermined audio-data file is transferred to the icon "MP3 file manager" shown in section (B), the predetermined audio-data file is stored at the top of tracks of the "Free Folder".

Further, the reproduction-order management list for generating the stored-audio-data list is updated every time the stored-audio-data list is modified. Subsequently, the display image of the latest stored-audio-data list is produced at all times and audio data is reproduced in the order that the user intends.

[Transfer and Management of Audio Data]

An example showing how audio data is transferred from the PC 2 to the IC recorder 1 and an example how the transferred audio data is managed will now be described.

[Data Transfer in Files]

FIGS. 5A, 5B, and 5C illustrate an example where audio data is transferred in files. FIG. 5A shows the state of the folder "AlbumF" stored in the contents disk 202 of the PC 2. FIG. 5B shows the stored-audio-data list. According to the stored-audio-data list, the flush memory 120 of the IC recorder 1 stores a folder "Free Folder" configured to store five audio-data files corresponding to five tracks, as indicated by file names "Free1", "Free2", "Free3", "Free4", and "Free5". The flush memory 120 further stores two album folders "AlbumXX" and "AlbumYY".

First, in this example, the user places a cursor on a predetermined folder such as the folder "Free Folder" on the stored-audio-data list shown in FIG. 5B and performs a predetermined operation such as double-clicking. Subsequently, the predetermined folder is opened, and a display image of the list of audio-data files stored in the predetermined folder is produced, as indicated by the file names "Free1", "Free2", and so forth that are shown in FIG. 5B.

Further, the user drags and drops an audio-data file "SongF4" of the folder "AlbumF" stored in the contents disk 202, as indicated by an arrow extending from FIG. 5A to FIG. 5B. Incidentally, the above-described operation is shown in this drawing, as "DRAG & DROP". Subsequently, the audio-data file "SongF4" is transferred to the flush memory 120.

That is to say, the user selects the icon of the audio-data file "SongF4" of the folder "AlbumF" by placing the cursor thereon, and moves the icon so that the icon is placed on the stored-audio-data list. When destination-instruction line LN displayed according to the position of the icon "SongF4" reaches the destination position, the user cancels the selection instruction of the icon "SongF4".

Subsequently, the audio-data file "SongF4" stored in the folder "AlbumF" of the PC 2 can be copied between the audio-data files "Free4" and "Free5" of the folder "Free Folder" in the flush memory 120, as shown in FIG. 5C.

[Data Transfer in Folders]

FIGS. 6A, 6B, and 6C illustrate an example where audio data is transferred in folders. FIG. 6A shows the state of folder "AlbumG" stored in the contents disk 202 of the PC 2. FIG. 6B shows the stored-audio-data list. According to the stored-audio-data list, the folder "Free Folder" and six album folders "AlbumA", "AlbumB", "AlbumC", "AlbumD", "AlbumE", and "AlbumF" are stored in the flush memory 120 of the IC recorder 1 in advance.

First, as indicated by an arrow shown between FIGS. 6A and 6B, the user drags and drops the entire album folder "AlbumG" stored in the contents disk 202, so as to transfer the album folder "AlbumG" to the flush memory 120. Incidentally, the above-described operation is shown, as "DRAG & DROP".

That is to say, the user selects the folder "AlbumG" by placing the cursor thereon, and moves the icon of the folder "AlbumG" so that the icon is placed on the stored-audio-data list. When the destination-instruction line LN displayed according to the position of the "AlbumG" icon reaches the destination position, the user cancels the selection of the icon "AlbumG".

Subsequently, the entire folder "AlbumG" of the PC 2 can be copied between the folders "AlbumE" and "AlbumF" that are stored in the flush memory 120, as shown in FIG. 6C.

[Transfer of Folder having Hierarchical Structure]

FIGS. 7A, 7B, 7C, 7D, 7E, and 7F illustrate how folders having a hierarchical structure are transferred. FIG. 7A shows folder "ArtistX", FIG. 7B shows folder "1ST Album", and FIG. 7C shows folder "2ND Album". Both the folders "1ST Album" and "2ND Album" are hierarchically-related to the folder "ArtistX".

Further, FIG. 7D shows the state of a stored-audio-data list before the folder "ArtistX" is transferred. Here, the stored-audio-data list denotes the audio-data list stored in the flush memory 120 of the IC recorder 1. FIG. 7E shows the state of the stored-audio-data list after the folder "ArtistX" is transferred. More specifically, FIG. 7E illustrates the state where the folder "ArtistX" is transferred to the IC recorder 1 and stored in the flush memory 120 of the IC recorder 1.

Here, the folder "ArtistX" stored in the contents disk 202 is transferred to the IC recorder 1. Operations performed for transferring the folder are the same as those in the example shown in FIGS. 6A, 6B, and 6C. That is to say, the user drags the folder "ArtistX" to the stored-audio-data list and drops the folder onto the list. Subsequently, the folder "ArtistX" is transferred and copied to the flush memory 120.

In this example, the folder "ArtistX" shown in FIG. 7A has audio-data files "SongA" and "SongB", and the folders "1ST Album" and "2ND Album". The folder "1ST Album" has audio-data files "SongC", "SongD", and "SongE", as shown in FIG. 7B. The folder "2ND Album" has audio-data files "SongF", "SongG", and "SongH", as shown in FIG. 7C.

That is to say, the folder "ArtistX" has control over not only the audio-data files "SongA" and "SongB", but also the folders "1ST Album" and "2ND Album" having control over a plurality of audio-data files. Namely, the folder "ArtistX" has control over other folders, which forms the hierarchical structure.

Further, as shown in FIGS. 7A and 7D, the user drags the folder "ArtistX" to the stored-audio-data list and drops the folder at the destination position on the stored-audio-data list. Subsequently, the folder "ArtistX" having the hierarchical structure is transferred and copied to the flush memory 120.

In that case, by transferring the folder "ArtistX" to the stored-audio-data list, the folder "ArtistX" is transferred and placed between the folders "AlbumE" and "AlbumF", as shown in FIG. 7E. At the same time, the folders "1ST Album" and "2ND Album" under the control of the folder "ArtistX" are transferred and copied to the flush memory 120. Of course, the audio-data files "SongA" and "SongB" in the folder "ArtistX" are transferred and copied to the flush memory 120.

That is to say, by transferring and copying the folder "ArtistX" of the PC 2 to the IC recorder 1, the audio-data files "SongA" and "SongB" under the control of the folder "ArtistX", the audio-data files "SongC", "SongD" and "SongE" under the control of the folder "1ST Album" under the control of the folder "ArtistX", and the audio-data files "SongF", "SongG" and "SongH" under the control of the folder "2ND Album" under the control of the folder "ArtistX" are transferred and copied to the flush memory 120 at the same time.

Thus, in this embodiment, audio data can be transferred from the PC 2 to the IC recorder 1 in folders and/or files. In the case where a folder having the hierarchical structure is transferred, audio-data files under the control of the folder are also transferred and copied to the IC recorder 1. Further, the audio-data files can be transferred and copied to the IC recorder 1 in consideration of the reproduction order.

[Reproduction-Order Management for Audio Data Transferred to IC Recorder 1]

A management method used for the audio data transferred and copied from the PC 2 to the flush memory 120 of the IC recorder 1 in the above-described manner will now be illustrated. FIGS. 8A, 8B, 8C, and 9 illustrate the management method used for the audio data in the IC recorder 1.

Figure 8A:
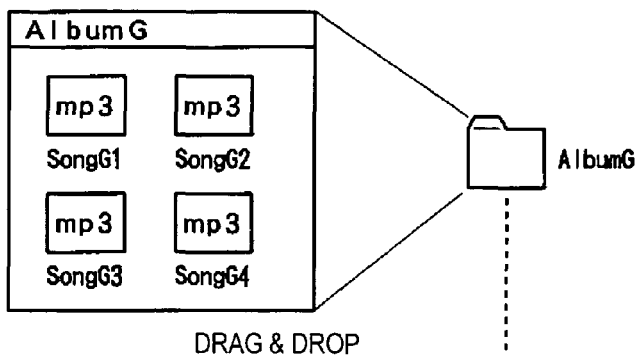
FIG. 8A illustrates a method for managing audio data in the IC recorder.

In this example, for simplicity's sake, the folder "AlbumG" shown in FIG. 8A stored in the contents disk 202 of the PC 2 is dragged and dropped onto the "MP3 file manager" registered in an audio folder generated in the flush memory 120 of the IC recorder 1. Subsequently, the folder "AlbumG" is transferred and copied to the flush memory 120.

As described above, the folder "AlbumG" of the PC 2 is dragged and dropped onto the "MP3 file manager" registered in the audio folder of the IC recorder 1, so that the folder "AlbumG" is transferred and copied to the IC recorder 1. Subsequently, the folder "AlbumG" is transferred and copied to the flush memory 120 of the IC recorder 1.

Figure 8B:
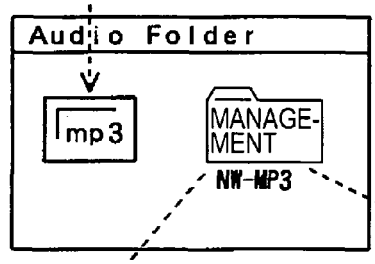
FIG. 8B also illustrates the method for managing the audio data in the IC recorder.
Figure 8C:
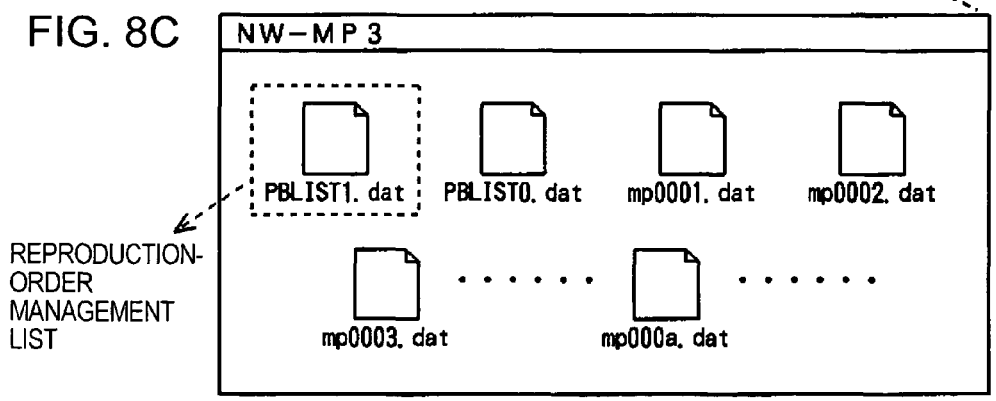
FIG. 8C also illustrates the method for managing the audio data in the IC recorder.

In that case, the transferred and copied audio data is stored in a management folder generated in the flush memory 120. In this example, the management folder is referred to as a folder NW-MP3, as shown in FIGS. 8B and 8C. Further, at the same time, a reproduction-order management list PBLIST1 configured to manage the reproduction order is generated in the management folder NW-MP3. The reproduction-order management list PBLIST1 includes original data forming the stored-audio-data list.

Further, according to this embodiment, a reproduction-order management list PBLIST0 is also generated in the management folder NW-MP3, as shown in FIG. 8C. Although the details of the list PBLIST0 are the same as those of the list PBLIST1, the state of the reproduction-order management list PBLIST0 corresponds to the next previous state of the reproduction-order management list PBLIST1. Therefore, the reproduction-order management list PBLIST0 can be used, as a backup copy of the reproduction-order management list PBLIST1, where the reproduction-order management list PBLIST1 is broken for some reasons.

The management folder NW-MP3 shown in FIG. 8C includes data files "mp0001. dat", "mp0002. dat", "mp0003. dat", and so forth corresponding to the audio-data files "SongG1", "SongG2", "SongG3", and so forth that are transferred from the PC 2.

Figure 9:
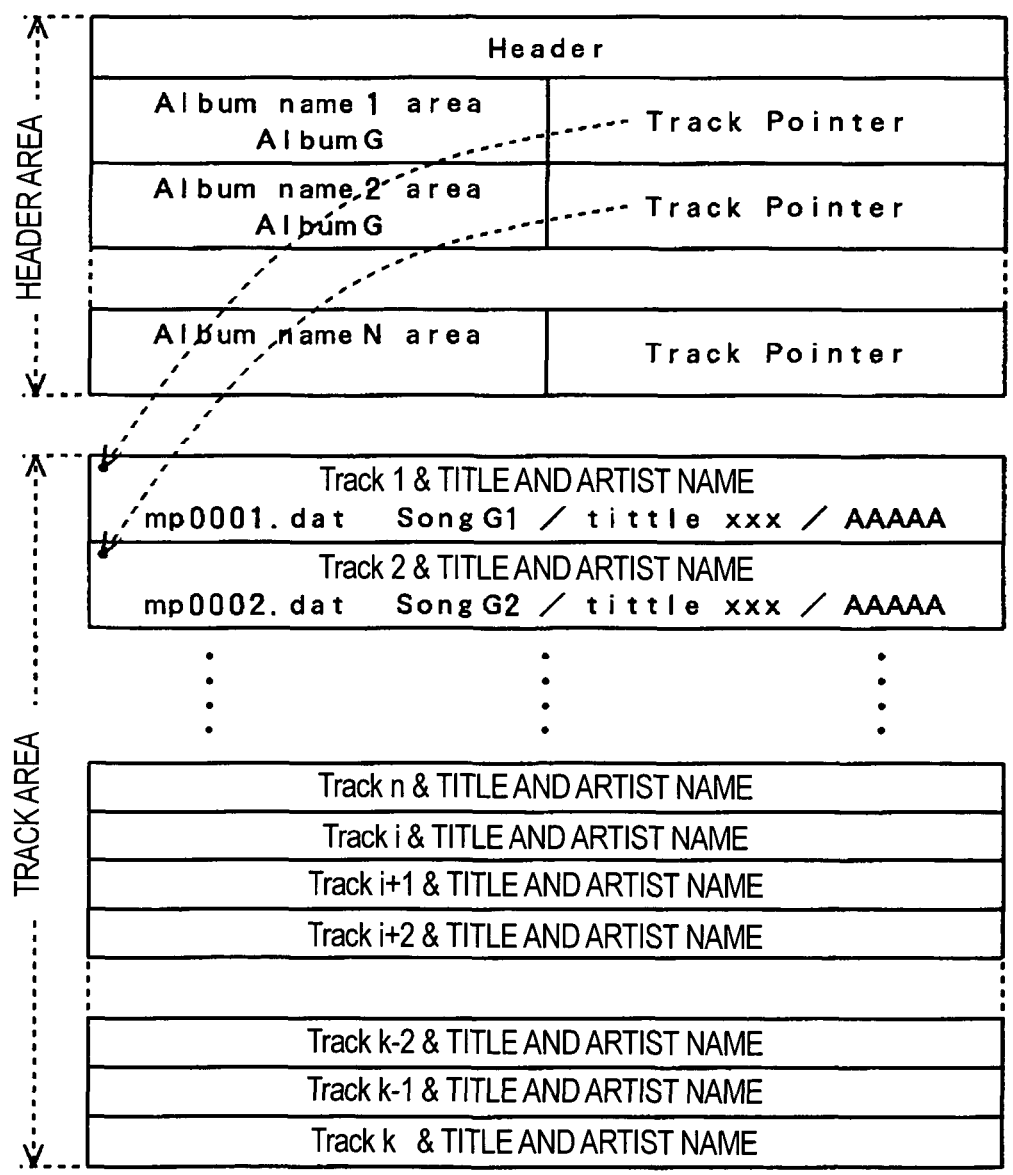
FIG. 9 also illustrates the method for managing the audio data in the IC recorder.

FIG. 9 shows the data structure of the reproduction-order management list PBLIST1. As shown in this drawing, the reproduction-order management list PBLIST1 includes a header area and a track area. The header area includes a header-information area (referred to as Header) of the reproduction-order management list PBLIST1 and many album-information areas. As shown in this drawing, each of the album-information areas includes an album-name area and a track-pointer area.

Each of the album-name areas shown in this drawing, as Album name 1 area, Album name 2 area, and so forth stores the name information of a predetermined folder, as the Album name. Further, each of the track-pointer areas is shown in this drawing, as Track Pointer. The track-pointer area stores the information about an audio-data file under the control of the corresponding folder, for example, the top addresses of tracks stored in the folder, as shown by broken arrows of this drawing. The number of the above-described album-information areas including the album-name area and the track-pointer area is the same as that of audio-data files under the control of the folders.

The track area stores file names after being subjected to filtering (information indicated as mp0001. dat and mp0002. dat in this drawing), original file names (information indicated as SongG1 and SongG2), titles obtained through the ID3 tag information (information indicated as title xxx), and artist names (information indicated as AAAAA). The ID3-tag information is information in a standard format configured to add information such as track names, author names, and music genres to the MP3 file.

Subsequently, this embodiment allows for managing audio data based on the linkage therebetween so that the name of a predetermined audio-data file in a predetermined folder (album) can be determined based on its ordinal position in the folder, specifying desired audio data with speed, and reproducing the audio data. That is to say, by referring to the reproduction-order management list PBLIST1 shown in this drawing, the stored-audio-data list shown in FIGS. 4 to 7F can be generated, and the audio data of the audio-data files can be reproduced in the order shown in the reproduction-order management list PBLIST1.

[Deletion and Movement of Folders and Files]

Thus, audio data can be transferred and copied from the PC 2 to the IC recorder 1. Further, folders and files that had been transferred to the IC recorder 1 can be deleted and/or moved.

Figure 10A:
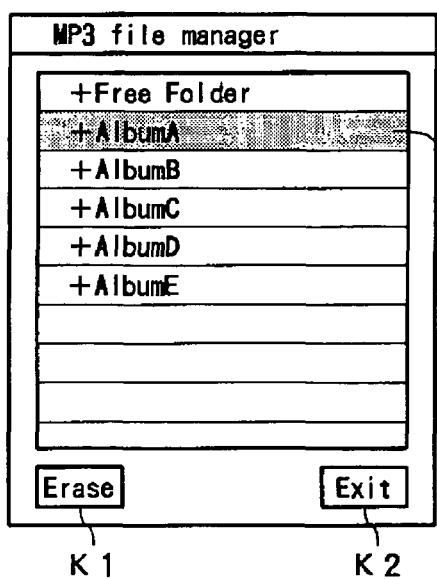
FIG. 10A illustrates an example where a folder stored in a flush memory of the IC recorder is deleted.
Figure 10B:
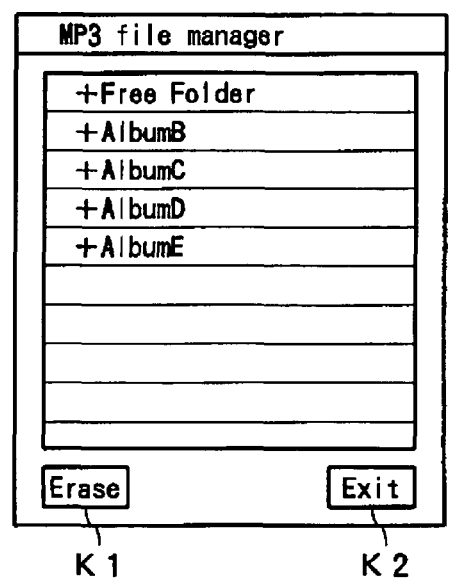
FIG. 10B also illustrates the example where the folder stored in the flush memory of the IC recorder is deleted.

FIGS. 10A and 10B illustrate an example where the folder "AlbumA" stored in the flush memory 120 of the IC recorder 1 is deleted. First, the user places a cursor CS on a folder for deletion, that is, the folder "AlbumA" in this embodiment on the stored-audio-data list that is generated based on the reproduction-order management list PBLIST1 and that is shown on the LCD 222 of the PC2, as shown in FIG. 10A. Then, the user selects an erase-icon K1 shown on the lower-left end of the stored-audio-data list. Subsequently, the folder "AlbumA" is deleted from the stored-audio-data list, as shown in FIG. 10B. At the same time, the information about the folder "AlbumA" is deleted from the reproduction-order management list PBLIST1.

In that case, the entire audio-data files under the control of the folder "AlbumA" are deleted from the flush memory 120 so that the flush memory 120 is cleaned up and used with efficiency.

Figure 11A:
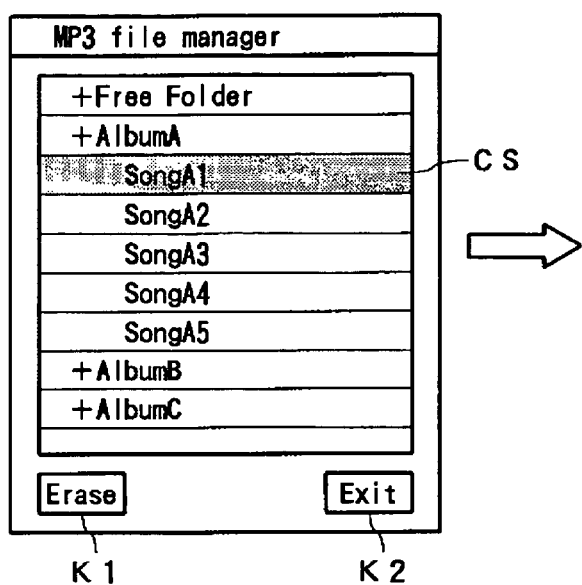
FIG. 11A illustrates an example where a file stored in the flush memory of the IC recorder is deleted.
Figure 11B:
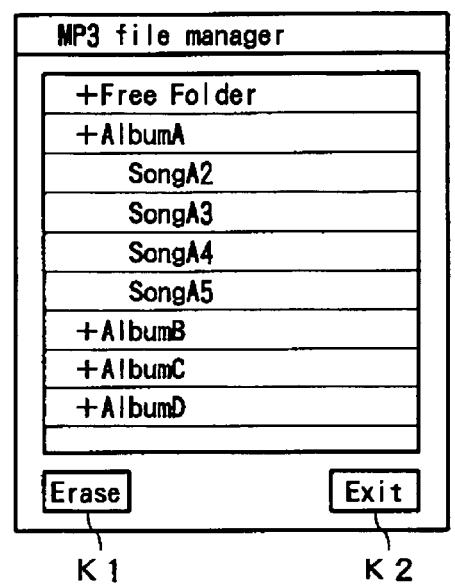
FIG. 11B also illustrates the example where the file stored in the flush memory of the IC recorder is deleted.

FIGS. 11A and 11B illustrate an example where an audio-data file stored in the flush memory 120 of the IC recorder 1 is deleted. First, the user places the cursor CS on a folder that exerts control over an audio-data file for deletion, that is, the folder "AlbumA" shown on the stored-audio-data list shown on the LCD 222. Then, the user performs a predetermined operation such as double-clicking, so that the list of the entire audio-data files under the control of the folder "AlbumA" is displayed, as shown in FIG. 11A.

Then, the user places the cursor CS on the audio-data file for deletion, that is, the audio-data file "SongA1" and selects the erase-icon K1 shown on the lower-left end of the stored-audio-data list. Subsequently, the audio-data file "SongA1" is deleted from the stored-audio-data list, as shown in FIG. 11B. At the same time, the information about the audio-data file "SongA1" is deleted from the reproduction-order management list PBLIST1.

In that case, the audio-data file "SongA1" is deleted from the flush memory 120 so that the flush memory 120 is cleaned up and used with efficiency.

Figure 12A:
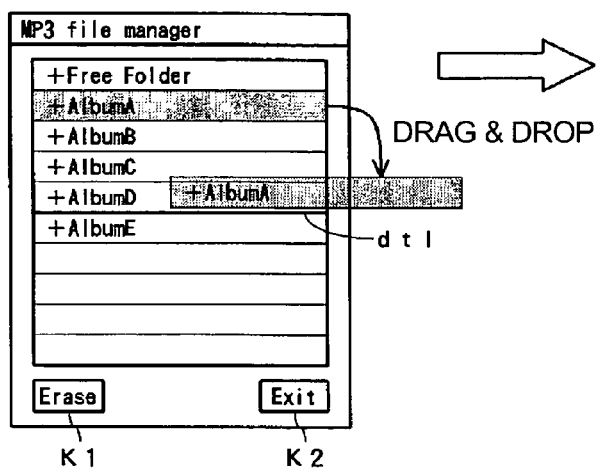
FIG. 12A illustrates an example where the folder stored in the flush memory of the IC recorder is moved.
Figure 12B:
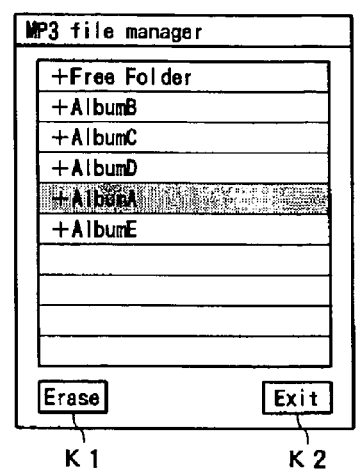
FIG. 12B also illustrates the example where the folder stored in the flush memory of the IC recorder is moved.

FIGS. 12A and 12B illustrates how to move a predetermined folder stored in the flush memory 120 from one position to another position. First, the user places the cursor CS on a folder for moving, that is, the folder "AlbumA" shown on the stored-audio-data list displayed on the LCD 222 of PC 2 in this embodiment. Then, the user moves the folder "AlbumA" selected by the cursor CS through the drag-and-drop operation.

In that case, a position-instruction line dt1 is displayed. The position-instruction line dt1 moves in synchronization with the folder "AlbumA" that moves according to the drag operation. The user drags the position-instruction line dt1 to the destination of the folder "AlbumA" and drops the position-instruction line dt1 at the destination. Subsequently, the folder "AlbumA" between the folders "Free Folder" and "AlbumB" is moved to the position between the folders "AlbumD" and "AlbumE".

Then, the details of the reproduction-order management list PBLIST1 are updated according to the moving operation, so as to change the reproduction order of the audio-data files under the control of the folder "AlbumA".

Thus, in the above-described embodiment, the folder "AlbumA" is moved from one position to another position in the stored-audio-data list. However, without being limited to the above-described embodiment, it may be arranged that the folder "AlbumA" be moved to another folder so that a hierarchical structure is established. Further, it may be arranged that a predetermined audio-data file be moved to a predetermined position. Of course, it may be arranged that the predetermined audio-data file be moved from one folder to another folder.

Thus, in this embodiment, audio data can be deleted and moved both in folders and files. That is to say, the user can delete and/or move a desired folder and/or a desired file stored in the flush memory 120 through a simple operation, that is, dragging and dropping the desired folder and/or the desired file on the stored-audio-data list shown on the LCD 222 of the PC 2.

[Short Description of System Operations]

Next, operations of the system including the IC recorder 1 and the PC 2 according to this embodiment of the present invention will now be described with reference to FIGS. 13, 14, 15, and 16.

As has been described, the IC recorder 1 and the PC 2 are connected to each other via the digital interface, and the IC recorder 1 is recognized, as the external drive of the PC 2. Then, when the control unit 200 of the PC 2 reads and executes the "MP3 file manager", that is, a program configured to transfer and manage audio-data files stored in the audio folders provided in the flush memory 120, the control unit 200 executes the operations shown in FIGS. 13 and 14.

In that case, the control unit 200 generates the stored-audio-data list by referring to the reproduction-order management list generated in the flush memory 120 via the external I/F 241 or the like, and produces a display image of the stored-audio-data list on the LCD 222 (step S101).

Then, the control unit 200 receives an operation instruction transmitted from the user via the key-operation unit 232 and the mouse 233 (step S102) and determines whether or not the operation instruction was transmitted (step S103). When the control unit 200 determines that no operation instruction was transmitted, at step S103, the control unit 200 repeats the operations at step S102 and later.

When it is determined that the operation instruction was transmitted, at step S103, the control unit 200 determines whether or not the operation instruction is an instruction for transferring the audio data accumulated on the contents disk 202 of the PC 2 to the flush memory 120 of the IC recorder 1 (step S104). The above-described determination at step S104 can be made based on the existence of a selected folder, or a selected file, for example. That is to say, where a folder, or a file stored in the contents disk 202 is the subject of the determination, the control unit 200 can determine that the operation instruction was the transfer instruction.

When the control unit 200 determines that the operation instruction transmitted thereto was the instruction for transferring a folder, or a file to the IC recorder 1, at step S104, the control unit 200 determines the format of audio data for transferring (step S105). The format determination at step S105 is performed for determining the compression method, the bit rate, the extension, and so forth of audio data to be processed, so as to determine whether or not the audio data can be reproduced by the IC recorder 1 of this embodiment.

Then, the control unit 200 determines whether or not the audio data for transferring can be reproduced by the IC recorder 1, based on the processing result obtained at step S105 (step S106). When it is determined that the audio data can be reproduced, the control unit 200 changes the audio-data format by removing an unnecessary extension, for example, and adds the audio data to an audio-data folder (MP3 folder) generated in the flush memory 120 (step S107).

After that, the reproduction-order management list PBLIST1 is updated according to the audio data that was transferred and added to the flush memory 120 (step S108), modifies the state of the display image of the stored-audio-data list so that the stored-audio-data list shows the transferred and added audio data (step S109). Then, the control unit 200 repeats the operations at step S102 and later.

When the control unit 200 determines that the audio data for transferring is irreproducible by the IC recorder 1, at step S106, the control unit 200 issues an irreproducible message (step S110) and repeats the operations at step S102 and later without performing the transfer operation.

When it is determined that an operation instruction transmitted thereto is not the audio-data transfer instruction, at step S104, the control unit 200 determines whether or not the transmitted operation instruction is a moving instruction (step S111). The determination at step S111 can be made based on the existence of a selected folder, or a selected file, for example. That is to say, when the user drags a folder, or a file stored in the flush memory 120, the control unit 200 can determine that the operation instruction is the moving instruction.

When it is determined that the operation instruction transmitted thereto is the moving instruction, at step S111, the control unit 200 modifies the data on the folder, or file for moving shown on the reproduction-order management list PBLIST1 according to the moving position (step S112), and modifies the display image of the stored-audio-data list according to the modification result (step S113). Then, the control unit 200 repeats the operations at step S102 and later.

Figure 14:
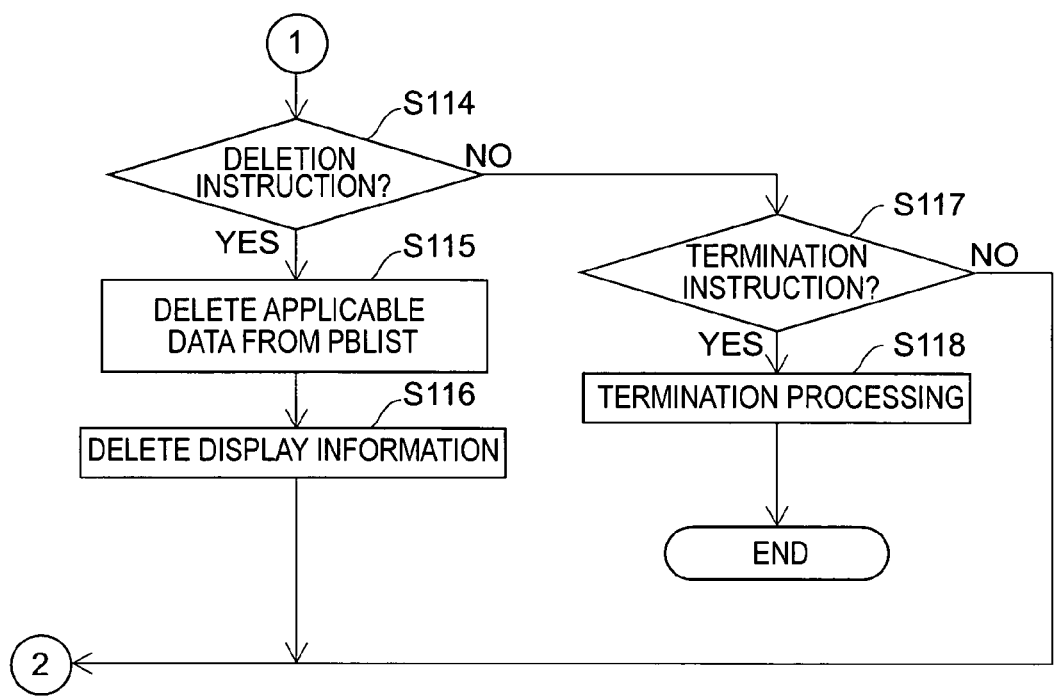
FIG. 14 is a flowchart illustrating operations performed by the system of this embodiment, the system including the IC recorder and the PC.

When it is determined that the received operation instruction is not the moving instruction, at step S111, the control unit 200 advances to step S114 shown in FIG. 14, so as to determine whether or not the received operation instruction is a deletion instruction. At step S114, the control unit 200 can determine whether or not the operation instruction is an audio-data deletion instruction according to whether or not an erase icon K1 shown on the lower-left end of the stored-audio-data list was selected.

When it is determined that the received operation instruction is the audio-data deletion instruction, at step S114, the control unit 200 deletes an audio-data folder or an audio-data file on which the cursor CS is placed from the reproduction-order management list PBLIST1 (step S115), produces a display image of the latest stored-audio-data list according to the reproduction-order management list PBLIST1 after the deletion (step S116), and repeats the operations at step S102 and later.

When it is determined that the received operation instruction is not the audio-data-deletion instruction, at step S114, the control unit 200 determines whether or not the received operation instruction is an instruction for transferring audio data and terminating management processing, that is, an instruction for terminating the MP3 file manager functioning as the processing program (step S117). At step S117, the control unit 200 can determine whether or not the operation instruction is the termination instruction according to whether or not an exit icon K2 shown on the lower-right end of the stored-audio-data list was selected.

Figure 13:
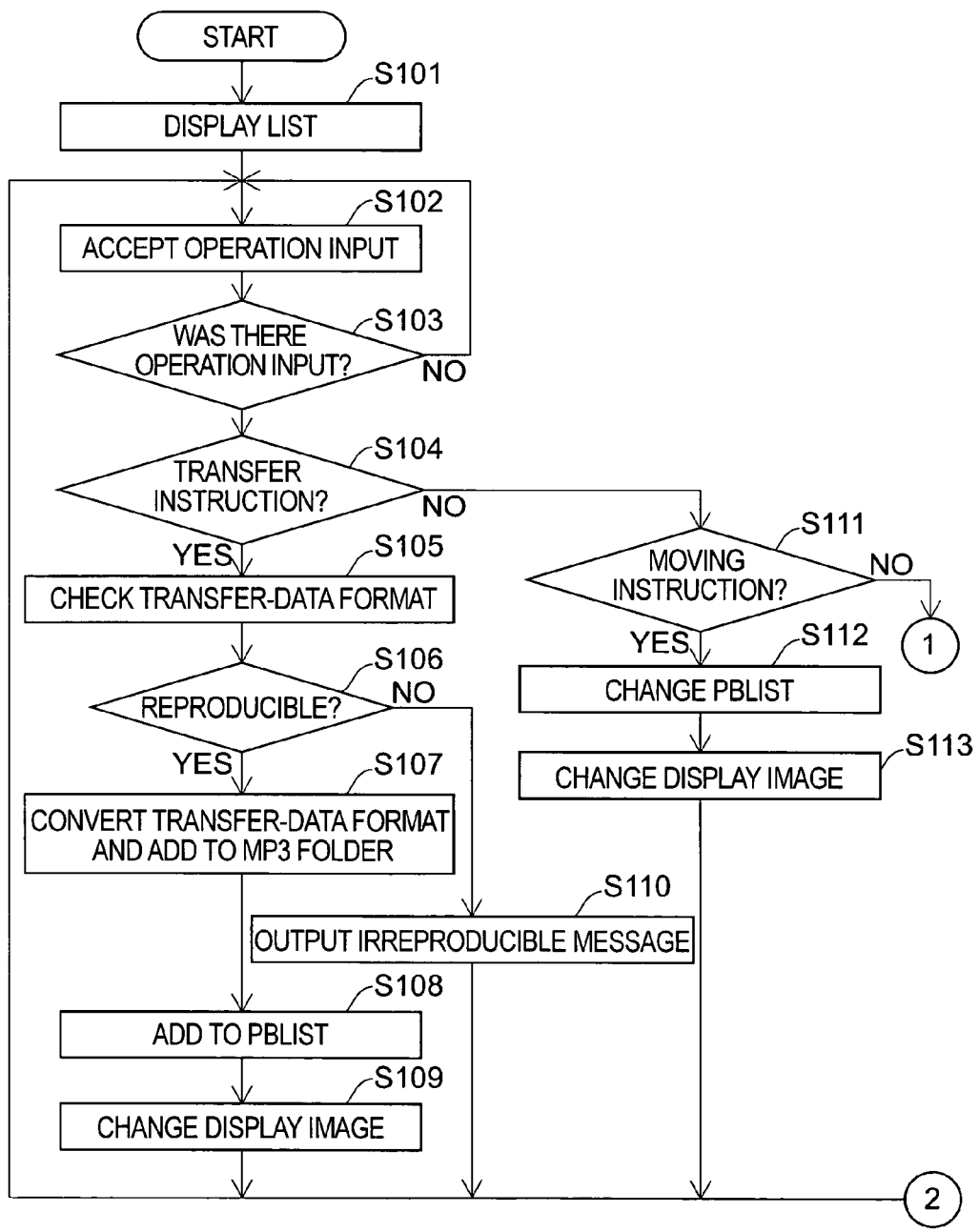
FIG. 13 is a flowchart illustrating operations performed by the system of this embodiment, the system including the IC recorder and the PC.

When it is determined that the received operation instruction is the termination instruction, at step S117, the control unit 200 executes termination processing, for example, closing a file in use (step S118), thereby terminating the operations shown in FIGS. 13 and 14. When it is determined that the received operation instruction is not the termination instruction, at step S117, the control unit 200 repeats the operations at step S102 and later shown in FIG. 13.

Thus, according to the system of this embodiment, the PC 2 recognizes the IC recorder 1 connected thereto via the digital interface, as the external driver, executes the program configured to transfer and manage the audio data stored in the flush memory 120, and transfers the audio data from the PC 2 to the IC recorder 1 so that the audio data is stored in the flush memory 120. Further, the PC 2 can change the reproduction order of the audio data that is transferred to the IC recorder 1 and stored in the flush memory 120 and/or delete the audio data with relative ease.

That is to say, since the program for transferring and managing audio data is stored in the flush memory 120 of the IC recorder 1, the program may not be installed on the PC 2. Subsequently, it becomes possible to use various types of PCs, so long as the PCs can be connected to the IC recorder 1. Therefore, it becomes easy to transfer audio data stored in the PC to the IC recorder 1 for use, change the reproduction order of the audio data that is transferred and stored in the IC recorder 1, delete an unnecessary data file, and so forth.

As has been described, the MP3 file manager, that is, the program for transferring and managing the audio data is stored in the audio folder AF, as shown in FIG. 4. However, the present invention may be achieved without being limited to the above-described embodiment. For example, the MP3 file manager may be stored in other folder and only the shortcut (a symbolic link) thereof may be stored in a folder to which an audio-data file, or an audio-data folder is transferred and stored therein. Thus, only one program may have to be installed without using a large storage capacity, even though the short cut thereof is copied to at least two folders according to the usage pattern of the user.

[Modification Example of Processing]

Further, for example, an audio-data file or an audio-data folder may be transferred and stored in the audio folder AF in the flush memory, as shown in FIG. 4. That is to say, audio data may simply be copied to the audio folder so that the audio data is expanded and shown on the reproduction-order management list PBLIST1 at a later time.

Then, where the MP3 file manager, that is, the program for transferring and managing audio data is executed and the audio folder AF stores audio data that is not expanded and shown on the reproduction-order management list PBLIST1, the unexpanded audio data may be automatically expanded and shown on the reproduction-order management list PBLIST1.

Figure 15:
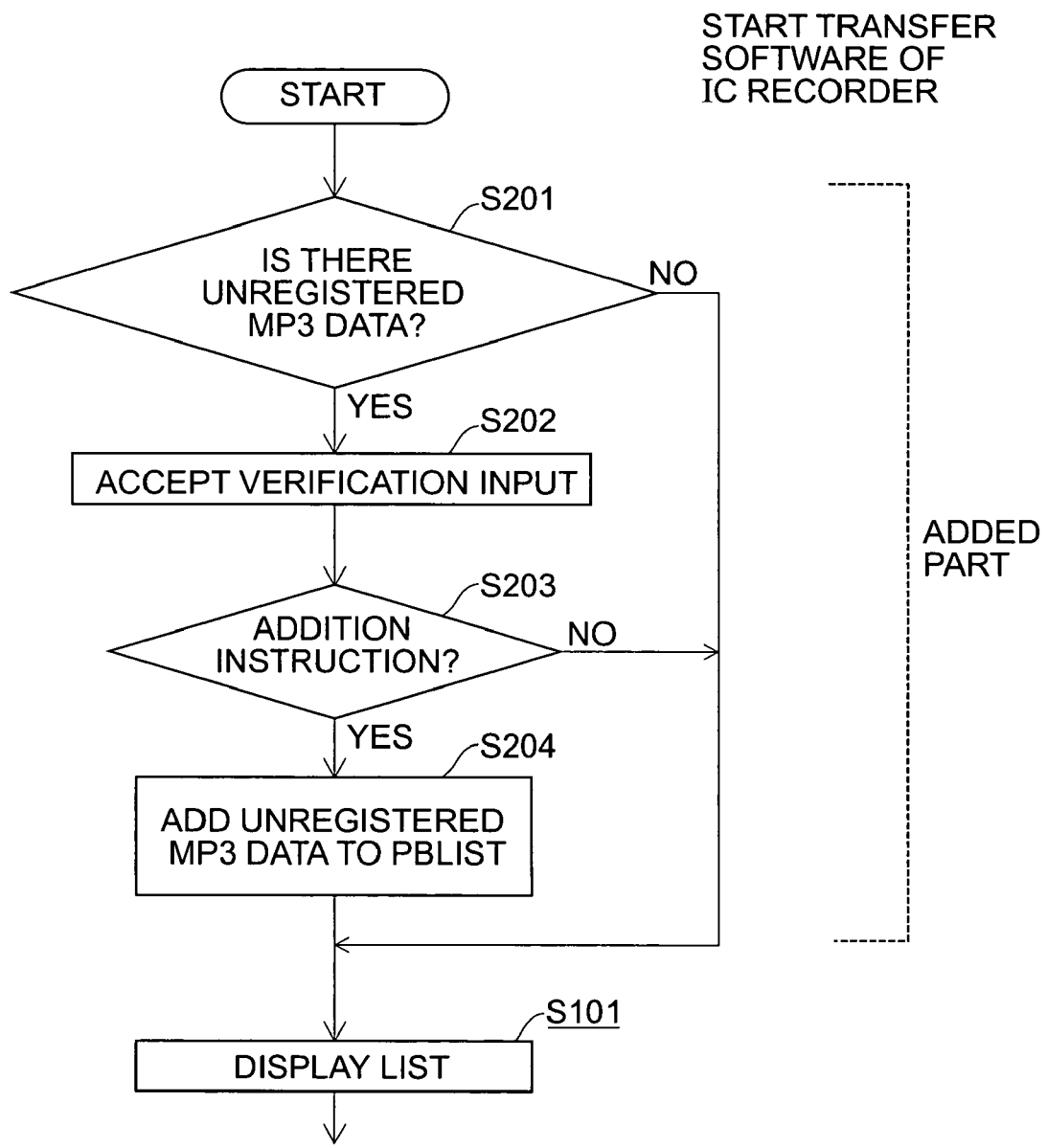
FIG. 15 is a flowchart illustrating other operations performed by the system of this embodiment, the system including the IC recorder and the PC.

FIG. 15 is a flowchart illustrating operations performed for automatically expand audio data in the reproduction-order management list PBLIST1. Operations from step S201 to step S204 shown in this drawing are performed prior to step S101 shown in FIG. 13.

That is to say, when the PC 2 executes the program for transferring and managing audio data, that is, the MP3 file manager stored in the flush memory 120, the control unit 200 of the PC 2 refers to the audio folder AF in the flush memory 120, and determines whether or not the audio folder AF holds audio data (MP3 data) that is not expanded in the reproduction-order management list PBLIST1 (step S201).

When it is determined that the audio data (MP3 data) that is not expanded in the reproduction-order management list PBLIST1 is held, at step S201, the control unit 200 accepts a confirmation about whether or not the unexpanded audio data should be expanded in the reproduction-order management list PBLIST1 (step S202). Then, the control unit 200 determines whether or not an expansion instruction (add instruction) was accepted (step S203). When it is determined that the expansion instruction was accepted; the unexpanded audio data (MP3 data) held in the audio folder AF is added to the reproduction-order management list PBLIST1 (step S204), and the operations described with reference to FIGS. 13 and 14 are performed.

When it is determined that the unexpanded audio data does not exist in the audio folder, at step S201 and when it is determined that the expansion instruction (add instruction) for the unexpanded audio data was not issued, at step S203, the operations at step S101 and later shown in FIG. 13 are performed.

According to the above-described configuration, where the user temporarily stores audio data in the audio folder AF, so as to expand the audio data in the reproduction-order management list PBLIST1 at a later time, it becomes possible to expand the audio data in the reproduction-order management list PBLIST1 with ease and reproduce the expanded audio data for use.

Figure 16:
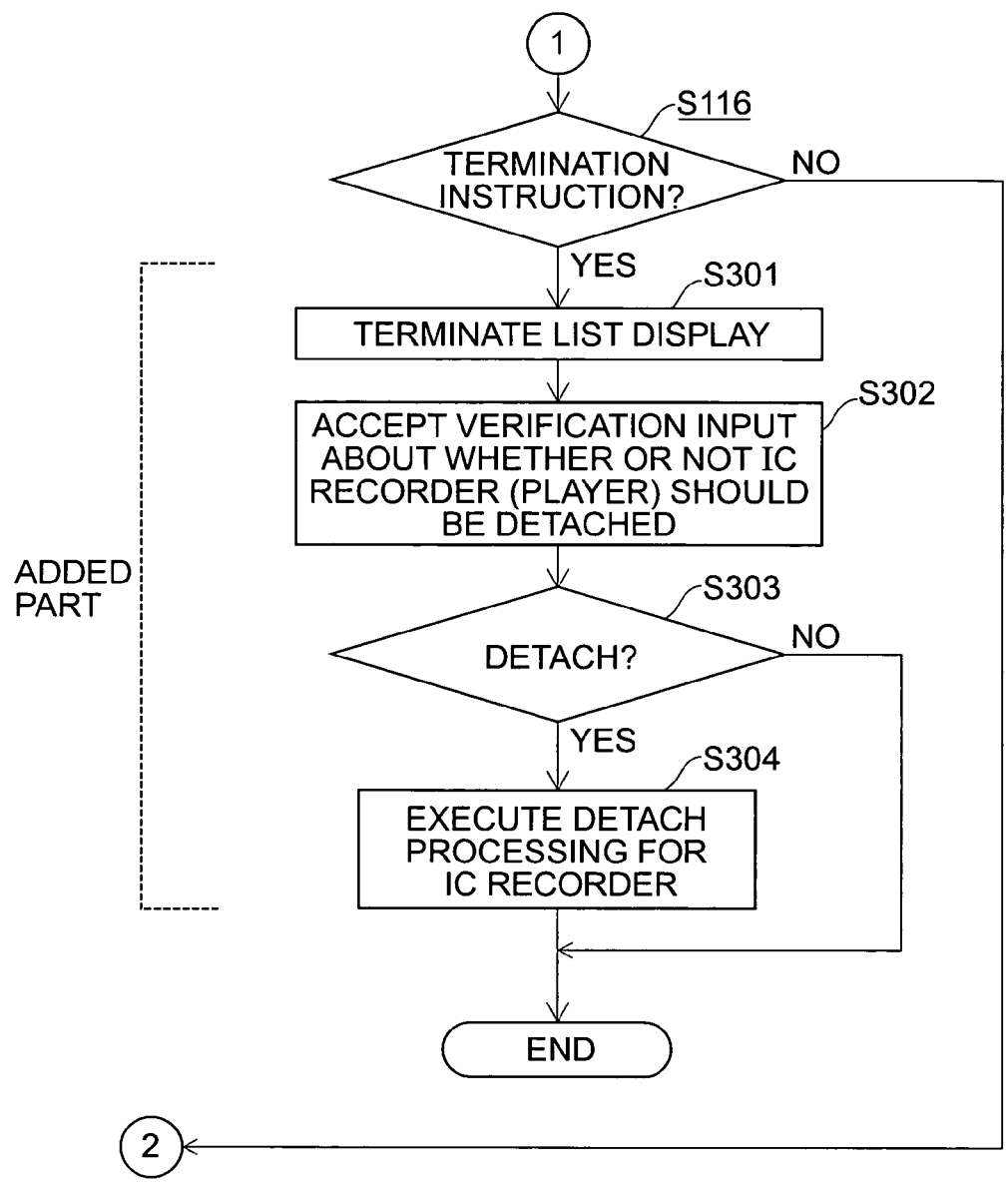
FIG. 16 is a flowchart illustrating other operations performed by the system of this embodiment, the system including the IC recorder and the PC.

Further, when the program for transferring and managing audio data, that is, the MP3 file manager is terminated, the IC recorder 1 may be detached from the PC 2. FIG. 16 is a flowchart illustrating operations performed for detaching the IC recorder 1 from the PC 2.

Operations from step S301 to step S304 shown in this drawing are performed, when it is determined that the termination instruction was accepted, at step S117 shown in FIG. 14. That is to say, when it is determined that the operation instruction transmitted from the user is the termination instruction, at step S117, the control unit 200 terminates the display image of the stored-audio-data list (step S301), and accepts a confirmation about whether or not the IC recorder 1 should be detached from the PC 2 (step S302).

Then, the control unit 200 determines whether or not the confirmation for detaching the IC recorder 1 from the PC 2 was accepted (step S303). When the control unit 200 determines that the detach-instruction confirmation was accepted, the control unit 200 performs detach processing for the IC recorder 1, that is, clearing connection-confirmation information in each of the PC 1 and the IC recorder 1, for example, so as to cancel the connection between the PC 2 and the IC recorder 1. Subsequently, the IC recorder 1 is detached from the PC 2 with safety (step S304), and the operations shown in FIGS. 13 and 14 are terminated.

When it is determined that the detach-instruction confirmation was not accepted, at step S303, the control unit 200 does not perform the detach processing at step S304 and terminates the processing operations shown in FIGS. 13 and 14.

Subsequently, it becomes possible to detach the IC recorder 1 from the PC 2 with speed and safety. Further, when the user wishes to stop the transfer processing and/or management processing for audio data temporarily, and restart the processing at a later time, the transfer processing and/or management processing for audio data can be terminated, even though the connection between the IC recorder 1 and the PC 2 is maintained.

[Modification Example of the Display Image of Stored-Audio-Data List]

FIGS. 17A and 17B show a modification example of the display image of the stored-audio-data list. Usually, the display image of the stored-audio-data list is shown on part of the screen of the LCD 222 of the PC 2, as shown in FIG. 17A. In the past, if the user wants to maximize the stored-audio-data list, only one screen image showing the stored-audio-data list is maximized.

However, since the storage capacity of the flush memory 120 is larger than those of flush memories in the past, the flush memory 120 can store a large number of audio-data files. Therefore, where the stored-audio-data list is maximized, as shown in FIG. 17B, maximized-display processing is performed for generating a plurality of screen images AR1, AR2, and AR3.

As has been described, the display image of the stored-audio-data list including the plurality of screen images or a plurality of display areas is shown on the screen of the LCD 222. Therefore, the readability of the stored-audio-data list increases, so that the transferring and management of audio data can be performed easily.

Where the screen images AR1, AR2, and AR3 are shown, as in FIG. 17B, and where the names of albums and/or files cannot be shown on the designation boxes of the screen images AR1, AR2, and AR3, each of sliders SR1, SR2, and SR3 that are shown on the lower ends of the screen images AR1, AR2, and AR3 may be slid, so as to slide the display areas of the screen images AR1, AR2, and AR3. Subsequently, the entire folder names and/or file names can be recognized.

[Others]

[Format Change for Data Transfer]

As has been described with reference to FIGS. 13 and 14, in this system of this embodiment, it is determined whether or not audio data for transferring is reproducible by the IC recorder 1. When it is determined that the audio data is reproducible, the data format of audio data is changed to another data format so that the audio data can be reproduced by the IC recorder 1.

By performing the above-described data-format change, the transfer program of this embodiment may not comply with various types of data formats. Therefore, the transfer program may be less functional. That is to say, in this embodiment, where audio data cannot be reproduced by the IC recorder 1 in its original format and where the format of the audio data can be changed, the format is changed. Further, the audio data is transferred and copied to the flush memory 120.

Further, in this embodiment, the format of the audio data transferred to the flush memory 120 is changed so that only the IC recorder 1 can reproduce the audio data. Therefore, the audio data stored in the flush memory 120 is prevented from being transferred to other reproducing device for use. That is to say, the system of this embodiment has the copy-guard function.

[Applicability to Memory Card]

According to the above-described embodiment, the transfer program, that is, the MP3 file manager executed by the PC 2 is installed on the flush memory 120 in the IC recorder 1.

Further, audio data is accumulated on the flush memory 120, so as to generate the reproduction-order management list functioning as the management file.

The present invention can be achieved, however, without being limited to the above-described embodiment. In recent years, IC recorders that use a detachable/attachable memory card, as a removable external memory, have been introduced. Therefore, where the IC recorder can use the memory card mounted thereon, as its memory, and where the memory is accessible by a PC connected to the IC recorder via a digital interface, a transfer program (the MP3 file manager in the above-described embodiment) executed by the PC may be installed on the memory card at the manufacturing time, so as to accumulate audio data and generate the reproduction-order management list PBLIST in the memory card.

Thus, in the case where the memory card has the transfer program installed thereon, the audio data accumulated thereon, and the management information generated therein, the audio data can be transferred and managed, as is the above-described case where the audio data is transferred to the flush memory 120 in the IC recorder 1 and the transferred audio data is managed.

[Use in Other than Audio Data]

Although the audio data is transferred from the PC to the IC recorder in the above-described embodiments, the present invention can be achieved without being limited thereto. In recent years, mobile-phone terminals, mobile TVs, and so forth having a display device such as a relatively large LCD and/or an organic EL display have been proposed.

Where the above-described mobile-phone terminal and/or the mobile TV includes a flush memory with a relatively large storage capacity, or where a memory card can be loaded into the mobile-phone terminal and/or the mobile TV, a transfer program for transferring and managing AV data (data for synchronizing video data and audio data for reproduction) and/or video data is installed in advance in the flush memory in the mobile-phone terminal, the mobile TVs, and so forth, or the detachable/attachable memory card.

Then, the AV data and/or the video data may be transferred from the PC to the flush memory, or the memory card, so that the data can be managed and reproduced.

Further, the PC may execute the transfer program that had been stored in a memory provided in a recording-and-reproducing apparatus that can be connected to the PC, or the detachable/attachable memory card so that the audio data, the AV data, the video data, text data, and a program can be transferred and managed.

That is to say, the present invention can be used for various types of recording-and-reproducing apparatuses that can record and reproduce various types of data including the audio data, the AV data, the video data, text data, and so forth.

According to the above-described embodiments, the audio data is compressed by the MP3 method. However, the present invention can be achieved without being limited to the above-described embodiments. For example, audio data that was compressed according to the ATRAC method, or other data compression methods can also be transferred and managed. That is to say, the audio data can be compressed by any compression method so long as the audio data can be processed by the IC recorder 1.

Subsequently, the AV data and the video data may be compressed according to various types of data-compression methods complying with the recording-and-reproducing apparatus.

Further, according to the above-described embodiments, the flush memory 120 included in the IC recorder 1 functions, as a memory for storing the transfer program, a memory for storing the audio data, and a memory for storing the management information (PBLIST). However, the present invention can be achieved, without being limited to the above-described embodiments. Where there is a plurality of memories accessible by an apparatus such as a PC, the memories can be used, as necessary.

What is claimed is:

1. A recording-and-reproducing apparatus comprising:
a connection end for connecting to an information-processing apparatus;
a memory accessible by the information-processing apparatus connected to the connection end and storing a software program executed by the information-processing apparatus so that at least one information signal is transferred from the information-processing apparatus and managed, where the software program is not stored on the information-processing apparatus;
a data memory that stores the at least one information signal transferred from the information-processing apparatus, where the software program is executed by the information-processing apparatus and is operable to implement a first drag and drop operation and a second drag and drop operation whereby information signals are transferred from the information-processing apparatus to the recording-and-reproducing apparatus, the information-processing apparatus comprising a display device to display an image of a list of the information signals stored in the data memory, an image of a list of information signals stored in the information-processing apparatus and the first and the second drag and drop operations;
a management memory for storing management information of the at least one information signal stored in the data memory, the management information being generated by the software program executed by the information-processing apparatus upon the first and the second drag and drop operations; and
reproduction-control means that performs control processing, so as to reproduce the at least one information signal stored in the data memory based on the management information stored in the management memory,
wherein the software program is executable by the information-processing apparatus to generate the image of a list of information signals stored in the data memory based on the management information and to generate an image of an audio data list comprising a free folder on top of one or more folders, the free folder is used to store various types of audio data files regardless of source(s) of the audio data files, and the one or more folders is used to store files of the information signals stored in the data memory and the information signals stored in the information-processing apparatus in a file/folder structure based on sources of the information signals,
wherein the first drag and drop operation transfers information signals to the image of the audio data list, the second drag and drop operation transfers information signals to an icon of the software program displayed on the display device and stores the transferred information signals in a predetermined position in the audio data list.

2. The recording-and-reproducing apparatus according to claim 1, wherein the software program is configured to transfer the at least one information signal in files and/or folders, wherein each of the folders includes a plurality of the files.

3. The recording-and-reproducing apparatus according to claim 1, wherein the software program is configured to move a reproduction position of the at least one information signal stored in the data memory, delete the at lest one information signal stored in the data memory, and change the management information stored in the management memory according to the moving and the deletion.

4. An information transfer-and-management method that causes a recording-and-reproducing apparatus to receive at least one information signal transmitted from an information-processing apparatus so that the at least one information signal can be used in a predetermined order that a user intends, the information transfer-and-management method comprising the steps of:

- storing a predetermined software program in a program memory of the recording-and-reproducing apparatus accessible by the information-processing apparatus, wherein the software program is executed by the information-processing apparatus so that the at least one information signal is transferred from the information-processing apparatus and managed, where the software program is not stored on the information-processing apparatus;
- transferring the at least one information signal to a data memory of the recording-and-reproducing apparatus accessible by the information-processing apparatus by making the information-processing apparatus accessible to the program memory of the recording-and-reproducing apparatus and execute the software program, the software program being operable to implement a first drag and drop operation and a second drag and drop operation whereby information signals are transferred from the information-processing apparatus to the recording-and-reproducing apparatus, the information-processing apparatus comprising a display device to display an image of a list of the information signals stored in the data memory, an image of a list of information signals stored in the information-processing apparatus and the first and the second drag and drop operations;
- generating predetermined management information about the at least one information signal that is transferred to the data memory in a management memory of the recording-and-reproducing apparatus accessible by the information-processing apparatus through the executed software program upon the fist and the second drag and drop operations; and
- reproducing the at least one information signal stored in the data memory by the recording-and-reproducing apparatus based on the management information stored in the management memory,
- wherein the software program is executable by the information-processing apparatus to generate the image of a list of information signals stored in the data memory based on the management information and to generate an image of an audio data list comprising a free folder on top of one or more folders, the free folder is used to store various types of audio data files regardless of source(s) of the audio data files, and the one or more folders is used to store files of the information signals stored in the data memory and the information signals stored in the information-processing apparatus in a file/folder structure based on sources of the information signals,
- wherein the first drag and drop operation transfers information signals to the image of the audio data list, the second drag and drop operation transfers information signals to an icon of the software program displayed on the display device and stores the transferred information signals in a predetermined position in the audio data list.

5. The information transfer-and-management method according to claim 4, wherein the software program is configured to transfer the at least one information signal in files and/or folders, wherein each of the folders includes a plurality of the files.

6. The information transfer-and-management method according to claim 4, wherein the software program is configured to move a reproduction position of the at least one information signal stored in the data memory, delete the at least one information signal stored in the data memory, and change the management information stored in the management memory according to the moving and the deletion.

7. A non-transitory recording medium that is rewritable and loaded into a recording-and-reproducing apparatus for use thereby, the recording medium comprising:

- a storage area accessible by the recording-and-reproducing apparatus, or an information-processing apparatus connected to a predetermined adapter, where the recording medium is loaded into the recording-and-reproducing apparatus, or the adapter, and the storage area stores a software program executed by the information-processing apparatus for transferring at least one information signal from the information-processing apparatus and managing the at least one information signal, where the software is not stored on the information-processing apparatus;
- a data area for storing the at least one information signal transferred from the information-processing apparatus, by using the software program executed by the information-processing apparatus, the software program being operable to implement a first drag and drop operation and a second drag and drop operation whereby information signals are transferred from the information-processing apparatus to the recording-and-reproducing apparatus, the information-processing apparatus comprising a display device to display an image of a list of the information signals stored in the data area, an image of a list of information signals stored in the information-processing apparatus and the first and the second drag and drop operations; and
- a management area for storing management information generated by the software program executed by the information-processing apparatus upon the first and the second drag and drop operations and used for reproducing the at least one information signal stored in the data area,
- wherein the software program is executable by the information-processing apparatus to generate the image of a list of information signals stored in the data memory based on the management information and to generate an image of an audio data list comprising a free folder on top of one or more folders, the free folder is used to store various types of audio data files regardless of. source(s) of the audio data files, and the one or more folders is used to store files of the information signals stored in the data area and the information signals stored in the information-processing apparatus in a file/folder structure based on sources of the information signals,
- wherein the first drag and drop operation transfers information signals to the image of the audio data list, the second drag and drop operation transfers information signals to an icon of the software program displayed on the display device and stores the transferred information signals in a predetermined position in the audio data list.

8. The non-transitory recording medium according to claim 7, wherein the software program is configured to transfer the at least one information signal in files and/or folders, wherein each of the folders includes a plurality of the files.

9. The non-transitory recording medium according to claim 7, wherein the software program is configured to move a reproduction position of the at least one information signal stored in the data memory, delete the at least one information signal stored in the data memory, and change the management information stored in the management memory according to the moving and the deletion.

* * * * *